(12) United States Patent
Raybern

(10) Patent No.: US 12,479,580 B2
(45) Date of Patent: Nov. 25, 2025

(54) RADIAL PAWL TRACKING LOCK MECHANISM

(71) Applicant: Textron Innovations Inc., Providence, KS (US)

(72) Inventor: Blake David Raybern, Wichita, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 116 days.

(21) Appl. No.: 18/532,885

(22) Filed: Dec. 7, 2023

(65) Prior Publication Data

US 2025/0187735 A1 Jun. 12, 2025

(51) Int. Cl.
*B64D 11/06* (2006.01)

(52) U.S. Cl.
CPC .................. *B64D 11/0696* (2013.01)

(58) Field of Classification Search
CPC ..... B64D 11/0696; B60N 2/08; B60N 2/0722
See application file for complete search history.

(56) References Cited

U.S. PATENT DOCUMENTS

| | | | | |
|---|---|---|---|---|
| 4,218,092 A * | 8/1980 | Schach | ............... | B60N 2/2352 297/367 R |
| 10,266,074 B2 * | 4/2019 | Anticuar | ............. | B60N 2/0806 |
| 10,596,926 B2 * | 3/2020 | Last | ................... | B64D 11/0639 |
| 11,760,233 B2 * | 9/2023 | Napau | .................. | B60N 2/0825 296/65.15 |
| 12,351,082 B1 * | 7/2025 | Wright | ..................... | B60N 2/08 |
| 2002/0101106 A1 * | 8/2002 | Kim | ..................... | B60N 2/0224 297/362.11 |
| 2012/0145867 A1 * | 6/2012 | Benthien | ............... | B60N 2/072 248/429 |
| 2022/0340051 A1 * | 10/2022 | Vandenheede | ....... | B60N 2/0818 |
| 2024/0025550 A1 * | 1/2024 | Marutzky | .......... | B64D 11/0696 |

* cited by examiner

*Primary Examiner* — David R Dunn
(74) *Attorney, Agent, or Firm* — SLATER MATSIL, LLP

(57) ABSTRACT

An embodiment position locking apparatus includes a track tube, convex-curved serrations in the track tube, a radial pawl, a pin, concave-curved serrations in the radial pawl, and a motion-translation component. The radial pawl may have a pivot point and the pin extending from the radial pawl. The motion-translation component may have a slot formed therein and disposed adjacent the radial pawl. The pin may extend into the slot so the slot at least partially constrains motion of the pin such that a pivotal motion of the motion-translation component is translated to a slider motion of the pin to control a rate of angular motion of the radial pawl pivoting about the pivot point and so the concave-curved serrations engage and disengage with the convex-curved serrations to lock and unlock a position of the track tube relative to the radial pawl.

20 Claims, 18 Drawing Sheets

RADIAL PAWL TRACKING LOCK MECHANISM

TECHNICAL FIELD

The present disclosure relates generally to a system for locking a position of a track, and in particular to a lock mechanism for releasably fixing a track for a seat positioning system.

BACKGROUND

A prior locking mechanism for adjusting a position of an aircraft seat utilized two teethed locking chucks, one chuck for restricting movement of the seat position for each direction. In other words, one chuck restricts forward movement and another chuck restricts backward movement, for example. As another example, one chuck restricts left direction movement and another chuck restricts right direction movement. A disadvantage of such prior locking mechanism is the added weight, added materials cost, and added manufacturing cost for having one locking chuck per direction of movement restriction.

A prior locking mechanism used locking chucks held in place by a wedging force due to a linear motion of the locking mechanism and its kinematics. This prior design inherently has some free play that occurs while the locking chucks are engaged or during the engagement. It is a disadvantage for the locking mechanism to have free play during engagement because it gives a less precise feel to the user when adjusting a seat position. It is also a disadvantage to have free play in the seat position, as this could be a source of unwanted vibrations to the person using the seat during flight, as well as a source of rattling noise, which could portray a lower quality for a user experience.

Another disadvantage of such prior locking mechanism is the linear force vectors applied to the locking mechanism for restricting movement, based on the kinematics and configuration of such mechanism, push the locking chuck in a direction towards disengagement. Back drive occurs when the force applied on the seat track is great enough to wedge the lock chuck, via interfacing teeth, toward a disengaged position, allowing the track to skip teeth engagement and move, or even cause damage to the teeth and the lock mechanism. To prevent back drive, the spring force applied on the locking mechanism to keep teeth of the locking chuck engaged with teeth on the track must be large enough to overcome typically forces translated to the locking chuck via the seat track, such as by a person sitting and such as during turbulence and hard landing scenarios. It is a disadvantage to require a strong spring force to retain engagement of the locking mechanism and to prevent back drive because it requires larger and heavier springs. Also, a disadvantage of prior locking mechanism is the large spring force that must be overcome by a person during adjustment of the seat position. This could be a disadvantage to persons with weaker or injured hands due to the larger handle force required by the user to disengage the locking mechanism, for example. Also, this could make the user experience in adjusting the seat uncomfortable, even for a sufficiently strong and fit person. Furthermore, the strong spring action could be a safety hazard, as a strong pinch point for fingers.

SUMMARY

An embodiment position locking apparatus for a seat includes a track tube, a set of convex-curved serrations, a radial pawl, a pin, a set of concave-curved serrations, and a motion-translation component. In the embodiment, the track tube extends along a track axis. In the embodiment, the set of convex-curved serrations are disposed along a first side of the track tube, and each of the convex-curved serrations is located along a partial circumference of the track tube at the first side of the track tube. In the embodiment, the radial pawl has a pivot point, the pin extends from a first side of the radial pawl, and the pin is separated from the pivot point by a first spaced distance. In the embodiment, the set of concave-curved serrations is disposed at a second side of the radial pawl, and the set of concave-curved serrations is configured to engage with the set of convex-curved serrations of the track tube to lock a position of the track tube along the track axis relative to the radial pawl. In the embodiment, the motion-translation component is disposed generally concentrically and at least partially about the track axis, the motion-translation component is disposed adjacent the first side of the radial pawl, and the motion-translation component has a slot formed therein. And in the embodiment, the pin extends into the slot, the slot is configured to at least partially constrain motion of the pin such that a pivotal motion of the motion-translation component about the track axis is translated to a slider motion of the pin by the slot to control a rate of angular motion of the radial pawl pivoting about the pivot point of the radial pawl and such that the rate of angular motion of the radial pawl differs from a rate of angular motion of the motion-translation component about the track axis for at least part of the pivotal motion of the motion-translation component.

An embodiment lock mechanism includes a cylindrical track, a set of curved track teeth, a radial pawl, a first pin portion, a set of curved pawl teeth, a first control housing portion, and a spring. In the embodiment, the cylindrical track extends along a track axis and along a first direction. In the embodiment, the set of curved track teeth is disposed in the cylindrical track, each of the curved track teeth extends along a second direction, and the set of curved track teeth is distributed along the first direction, where the second direction is generally perpendicular to the first direction. In the embodiment, the radial pawl is configured to pivot about a pivot axis, the pivot axis is generally parallel with the track axis, and the pivot axis is separated from the track axis by a first spaced distance. In the embodiment, the first pin portion extends along the first direction and extends from a first side of the radial pawl, and the first pin portion is separated from the pivot axis by a second spaced distance. In the embodiment, the set of curved pawl teeth is disposed on a second side of the radial pawl, each of the curved pawl teeth extends along a third direction, the third direction is generally perpendicular to the first direction and generally perpendicular to the pivot axis, the set of curved pawl teeth is configured to generally mate with a subset of the set of curved track teeth, and the set of curved pawl teeth is separated from the pivot axis by a third spaced distance. In the embodiment, the cylindrical track extends through the first control housing portion, the first control housing portion is generally concentric with the cylindrical track and configured to pivot generally about the track axis, a first slot is disposed in a first side of the first control housing portion, the first pin portion is disposed in the first slot such that the first side of the radial pawl faces the first side of the first control housing portion, the first slot has a first inner slot portion and a first outer slot portion, the first outer slot portion extends at a greater radial distance from the track axis than the first inner slot portion, and a first outer change in radial distance from the track axis per pivot angle about the track axis for the first outer slot portion is greater than a first inner change in radial distance from the track axis per pivot angle about the track axis for the first inner slot portion. And in the embodiment, the spring is coupled to the first control housing portion at a fourth spaced distance from the track axis, and the spring is configured to bias the first control housing portion such that the first pin portion is held in the first inner slot portion such that the set of curved pawl teeth of radial pawl mate with the subset of the set of curved track teeth of the cylindrical track to lock a position of the cylindrical track relative to the radial pawl.

An embodiment method for installing a position locking apparatus for a seat includes providing a track tube having a track axis extending along a center of the track tube, where the track tube has a set of convex-curved serrations disposed along a first side of the track tube, where each of the convex-curved serrations is located along a partial circumference of the track tube at the first side of the track tube, providing a radial pawl having a pivot point, where the radial pawl has a pin extending from a first side of the radial pawl, where the pin is separated from the pivot point by a first spaced distance, and where a set of concave-curved serrations is disposed at a second side of the radial pawl, providing a motion-translation component, where the motion-translation component has a slot formed therein, placing the first side of the radial pawl adjacent the motion-translation component, such that the pin extends into the slot, where the slot is configured to at least partially constrain motion of the pin such that a pivotal motion of the motion-translation component about the track axis is translated to a slider motion of the pin by the slot to control a rate of angular motion of the radial pawl pivoting about the pivot point of the radial pawl and such that the rate of angular motion of the radial pawl differs from a rate of angular motion of the motion-translation component about the track axis for at least part of the pivotal motion of the motion-translation component, and placing and aligning the track tube adjacent the motion-translation component and the radial pawl, such that a motion-translation component is disposed generally concentrically and at least partially about the track axis, and such that the set of concave-curved serrations is positioned and configured to engage with the set of convex-curved serrations of the track tube to lock a position of the track tube along the track axis relative to the radial pawl.

BRIEF DESCRIPTION OF THE DRAWINGS

The above and other features and advantages of the present disclosure can be more apparent based on the following detailed description taken in conjunction with the accompanying drawings, in which.

DETAILED DESCRIPTION OF ILLUSTRATIVE EMBODIMENTS

Figure 1:
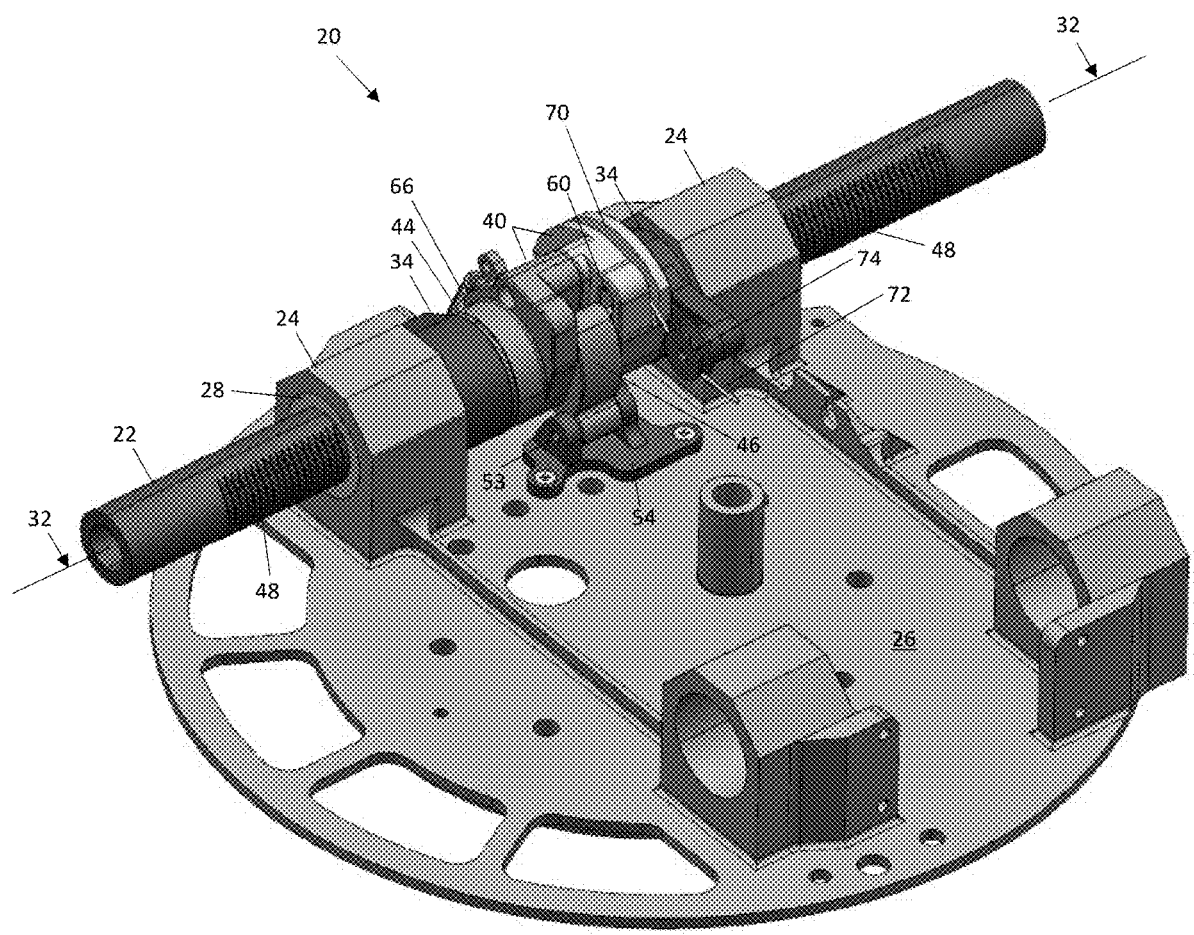
FIG. 1 is a perspective view showing partial components of an aircraft seat structure including a locking mechanism according to some embodiments.

Referring now to the drawings, wherein like reference numbers are used herein to designate like or similar elements throughout the various views, illustrative embodiments are shown and described. The figures are not necessarily drawn to scale, and in some instances the drawings can be exaggerated or simplified in places for illustrative purposes only. One of ordinary skill in the art can appreciate many possible applications and variations for other embodiments based on the following illustrative embodiments provided in the present disclosure.

FIG. 1 is a perspective view showing partial components of an aircraft seat structure including a locking mechanism 20 according to some embodiments. In FIG. 1, many other components and parts of the aircraft seat structure are omitted to focus attention on the locking mechanism 20. The locking mechanism 20 of FIG. 1 has a track tube 22, which may be attached to a seat bucket structure such that the track tube 22 is fixed relative to the seat bucket structure, and a seat structure of an aircraft may have several track tubes and locking mechanisms, for example. In some embodiments, the track tube 22 may be made from stainless steel tubing.

Figure 2:
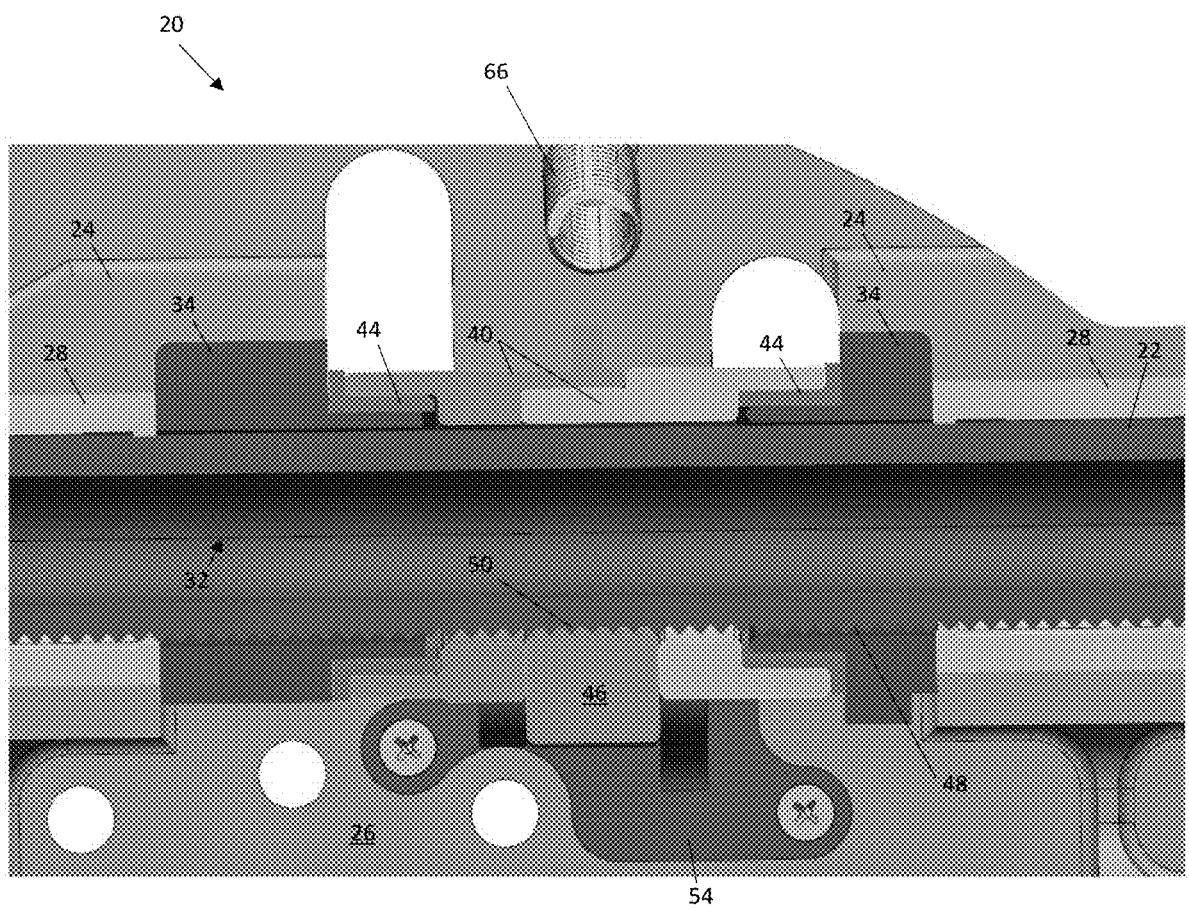
FIG. 2 is a cut-away top view of a locking mechanism in an engaged or locked position according to some embodiments.
Figure 3A:
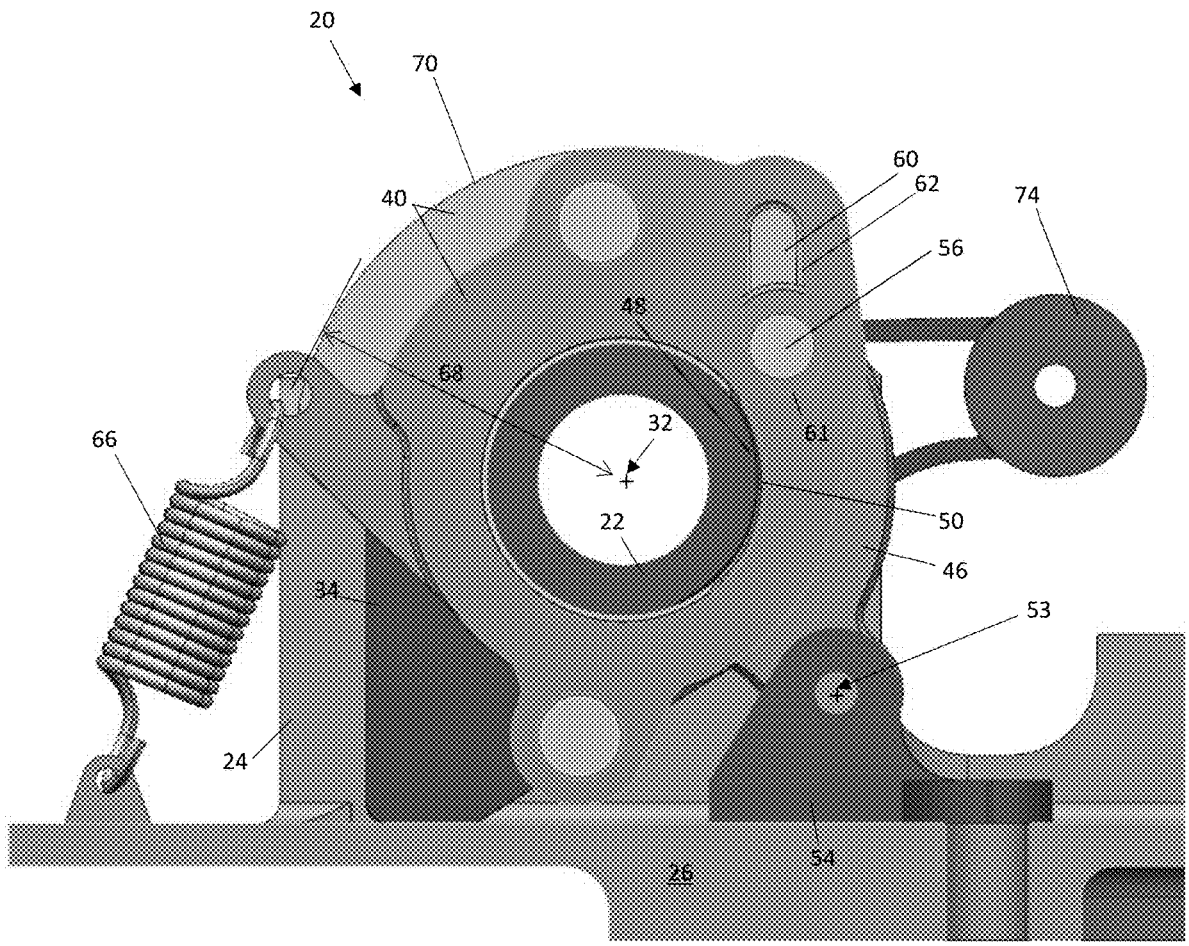
FIG. 3A is a cut-away side view of a locking mechanism in an engaged or locked position according to some embodiments.
Figure 3B:
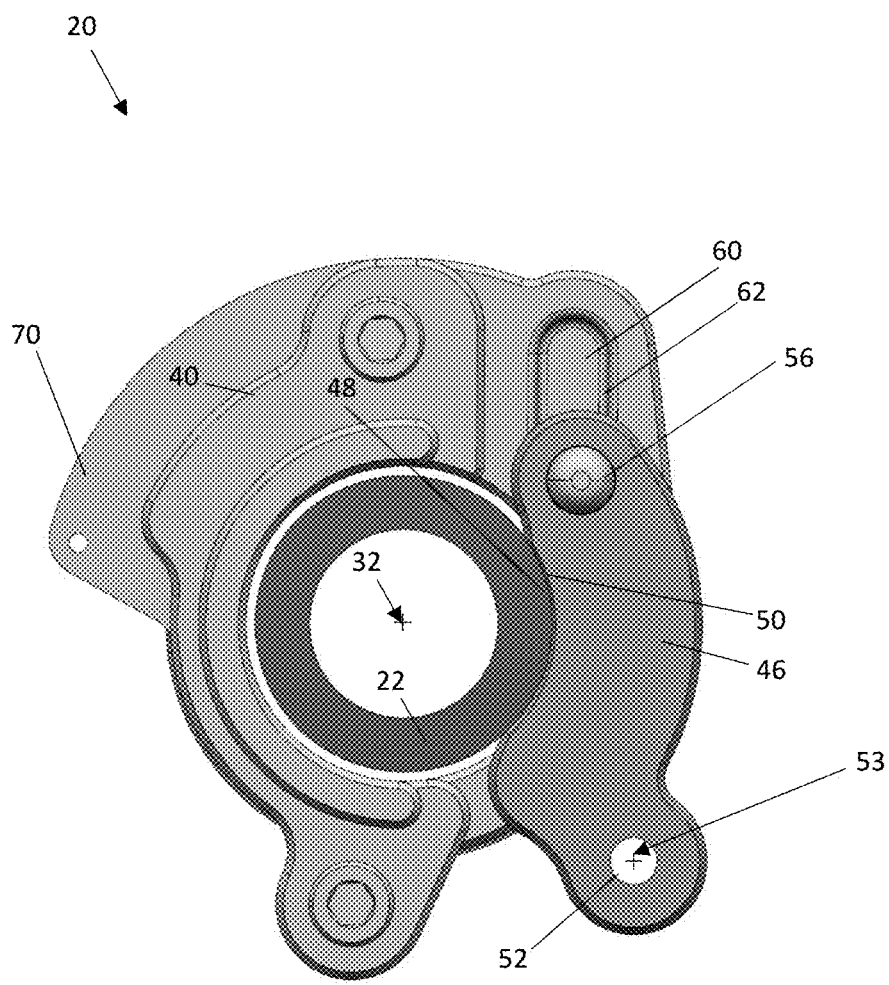
FIG. 3B is a side view illustrating some portions of a locking mechanism in an engaged or locked position according to some embodiments.
Figure 4A:
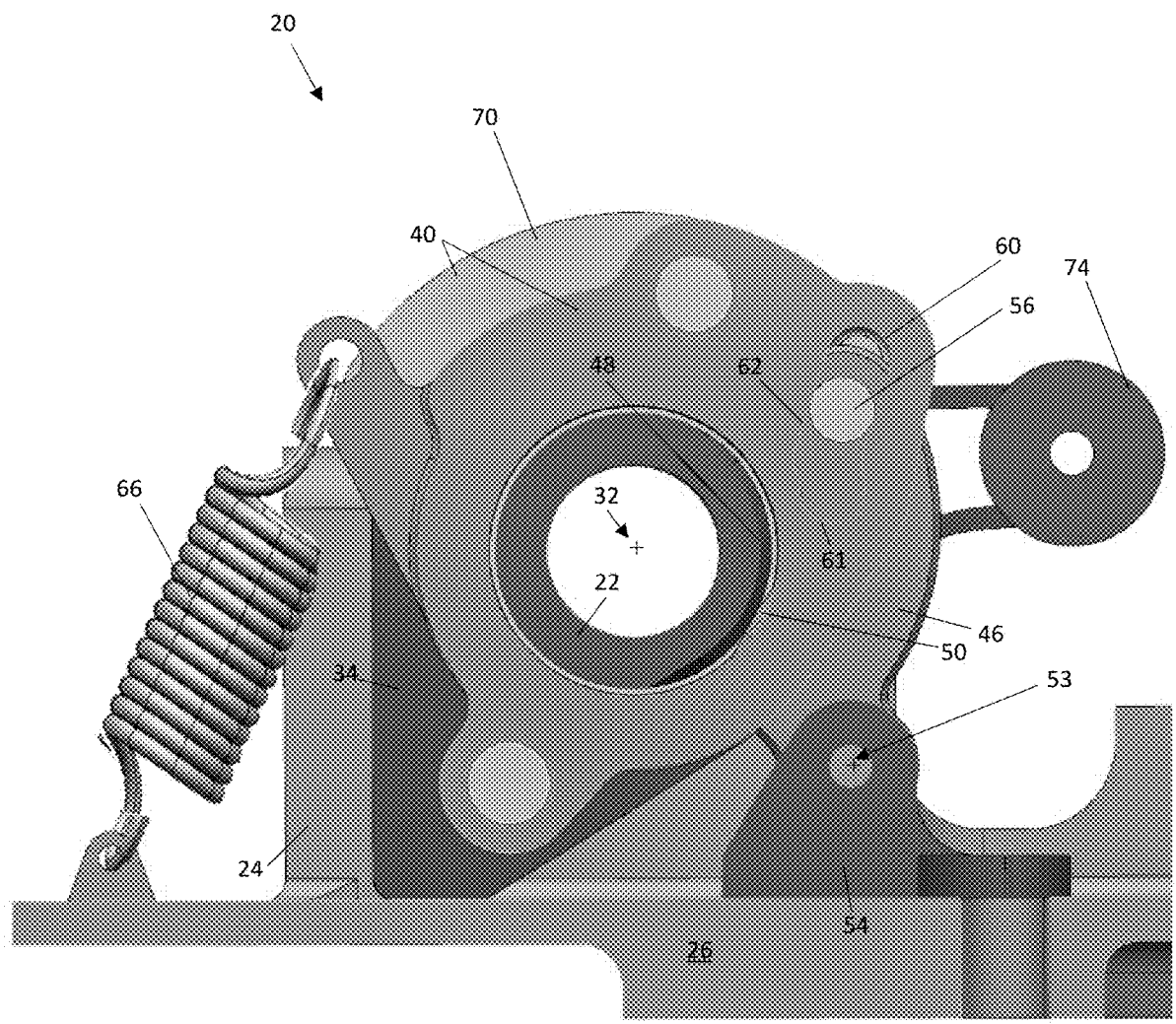
FIG. 4A is a cut-away side view of a locking mechanism in a partially disengaged position according to some embodiments.
Figure 4B:
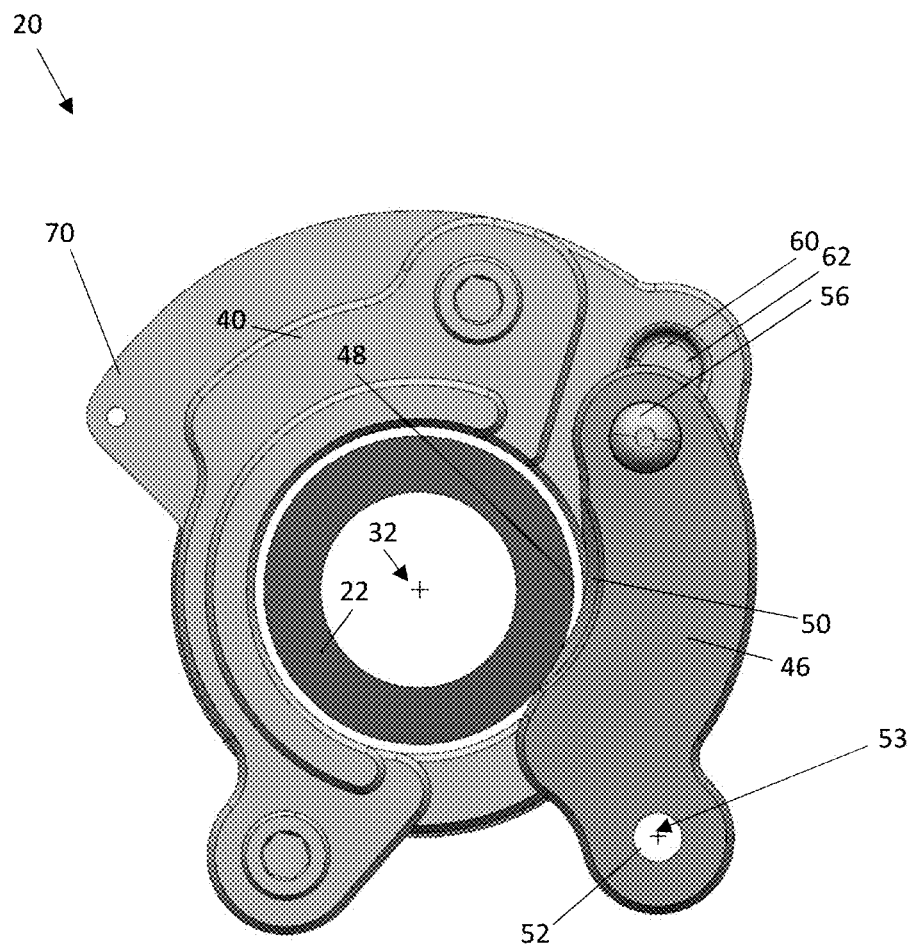
FIG. 4B is a side view illustrating some portions of a locking mechanism in a partially disengaged position according to some embodiments.
Figure 5A:
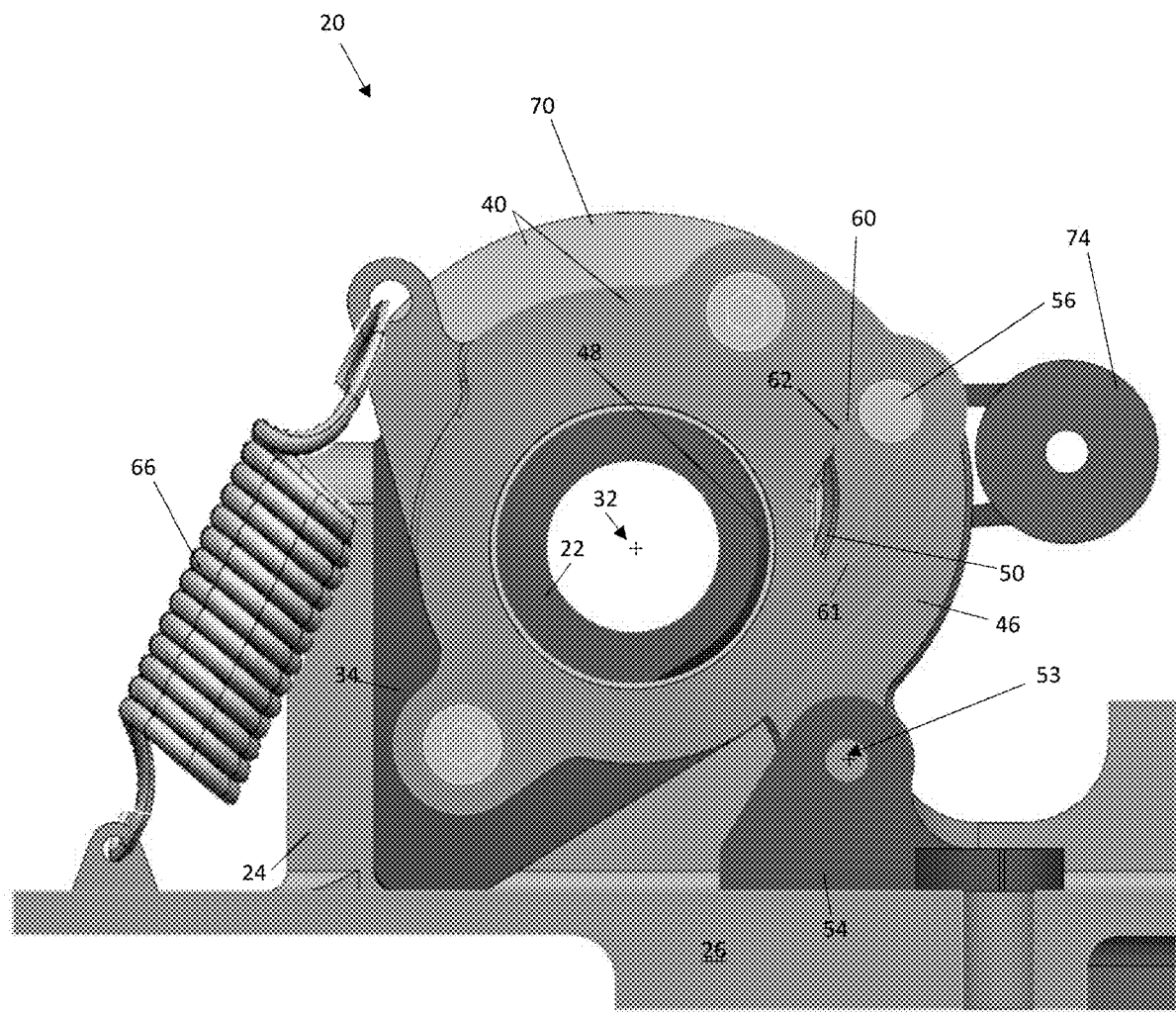
FIG. 5A is a cut-away side view of a locking mechanism in a disengaged and unlocked position according to some embodiments.
Figure 5B:
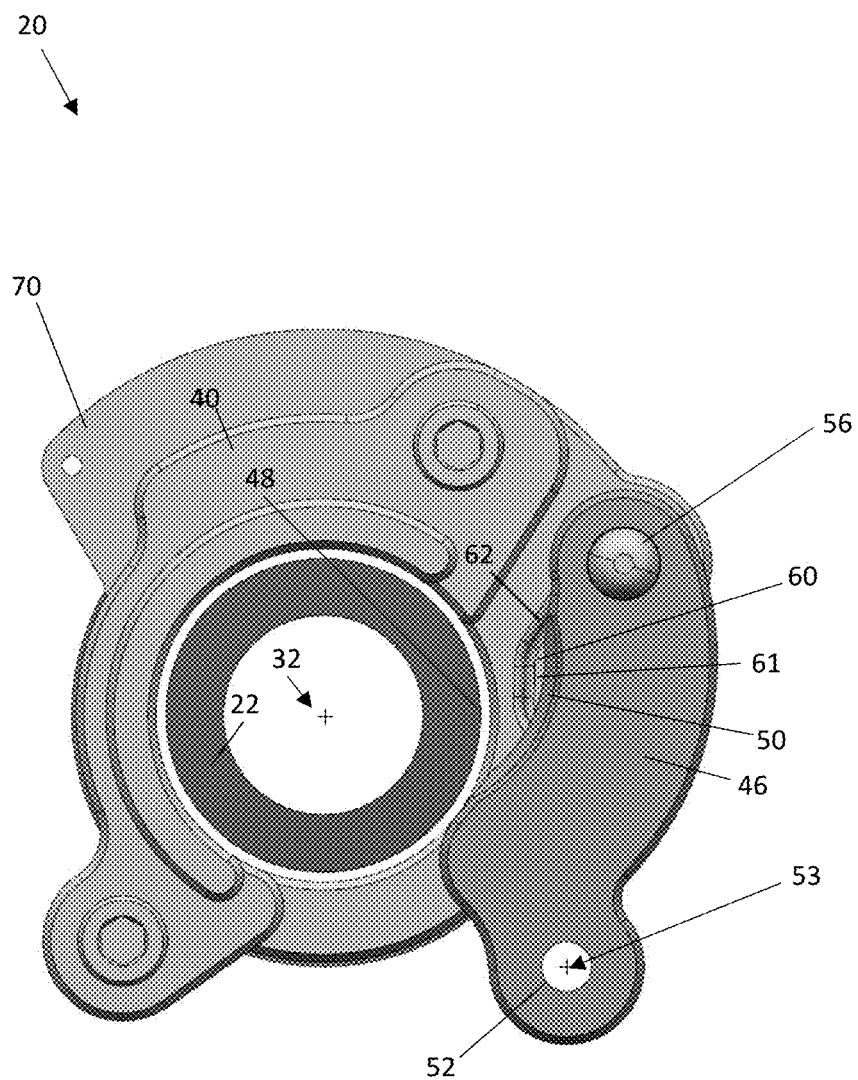
FIG. 5B is a side view illustrating some portions of a locking mechanism in a disengaged and unlocked position according to some embodiments.

FIG. 2 is a cut-away top view of the locking mechanism 20 embodiment of FIG. 1, shown in an engaged or locked position. FIG. 3A is a cut-away side view of the locking mechanism 20 embodiment of FIG. 1, shown in an engaged or locked position. FIG. 3B is a side view illustrating some portions of the locking mechanism 20 embodiment of FIG. 1, also shown in an engaged or locked position. FIG. 4A is a cut-away side view of the locking mechanism 20 embodiment of FIG. 1, shown in a partially disengaged position. FIG. 4B is a side view illustrating some portions of the locking mechanism 20 embodiment of FIG. 1, also shown in a partially disengaged position. FIG. 5A is a cut-away side view of the locking mechanism 20 embodiment FIG. 1, shown in a disengaged and unlocked position. FIG. 5B is a side view illustrating some portions of the locking mechanism 20 embodiment of FIG. 1, also shown in a disengaged and unlocked position.

In some embodiments, the track tube 22 may be supported by two pillow blocks 24 extending from a swivel plate 26 of an aircraft seat structure. Although example embodiments used in an aircraft seat structure are discussed herein, some embodiments may be adapted or configured to be used for other applications and uses, as may be apparent to one of ordinary skill in the art to which the present disclosure pertains, such as automobile seat structures, spacecraft seat structures, train seat structures, construction equipment seat structures, furniture seat structures, or non-seat structures, for example. The track tube 22 may provide the interface between a seat bucket structure and the swivel plate 26 in an aircraft seat structure, for example. The swivel plate 26 of a seat structure may be where loading on the seat bucket, such as be a person using the seat, is transferred under various directional loads. The track tube 22 may be supported by linear bearings 28.

Linear bearings 28 may be inserted into the pillow blocks 24 to allow the track tube 22 to freely move or slide along a track axis 32 in two directions, such as left and right, up and down, forward and backwards, depending on the orientation of the swivel plate 26 or the orientation and placement of a seat structure. When discussing a locking mechanism 20 embodiment, the swivel plate 26 may be considered as or treated as a static reference frame in a loading analysis and in a kinetic operation of the mechanisms, for example. The pillow blocks 24 may be integral with the swivel plate 26, or may be separate components attached or fixed to the swivel plate 26, such as by using screws, bolts, rivets, adhesive, snaps, clips, clamps, press fit, hook-and-loop fasteners, latches and catches, bayonet, thermal bonding, crimping, threaded inserts, welding, or any combination thereof. In some embodiments, the pillow blocks 24 and the swivel plate 26 may be made from CNC machined aluminum billet.

In some embodiments, two control housing pivot mounts 34 may be separate components, as illustrated in FIG. 2, or such structures may be integral to the pillow blocks 24 or the swivel plate 26, for example. In some embodiments, the control housing pivot mounts 34 may be made from CNC machined aluminum billet. The control housing pivot mounts 34 may be screwed or bolted to the pillow blocks 24 and secured to the swivel plate 26 for transferring loads to the swivel plate 26 via the pillow blocks 24. The control housing pivot mounts 34 may fully surround the track tube 22 between two pillow blocks 24, as illustrated in FIGS. 1 and 2. In some embodiments, one or both of the control housing pivot mounts 34 may not fully surround the track tube 22, or may be multi-piece components allowing for its removal without removing the track tube 22, for example. The control housing pivot mounts 34 may allow for axial loading and forces to be efficiently distributed and transferred to the pillow blocks 24, which may be advantageous compared to prior systems that apply loads and forces with a cantilevered moment arm via a mechanism. Additionally, an advantage of the design for the embodiment shown in FIGS. 1 and 2 is that the screws or bolts used to secure the control housing pivot mounts 34 to the pillow blocks 24 are used primarily for positioning the control housing pivot mounts 34 and are not necessarily required to bear large loads because loads can be transferred to the pillow blocks 24 by the contact of the control housing pivot mounts 34 against the pillow blocks 24.

In some embodiments, a locking mechanism 20 includes a two-piece control housing or motion-translation components. The control housing 40 portions may be supported by the control housing pivot mounts 34 via a set of bushings 44, as illustrated in FIGS. 1 and 2, for example. The bushings 44 shown in FIG. 2 may be stainless steel thrust bushings. In some embodiments, the control housing 40 portions may be made from CNC machined aluminum billet.

Figure 6:
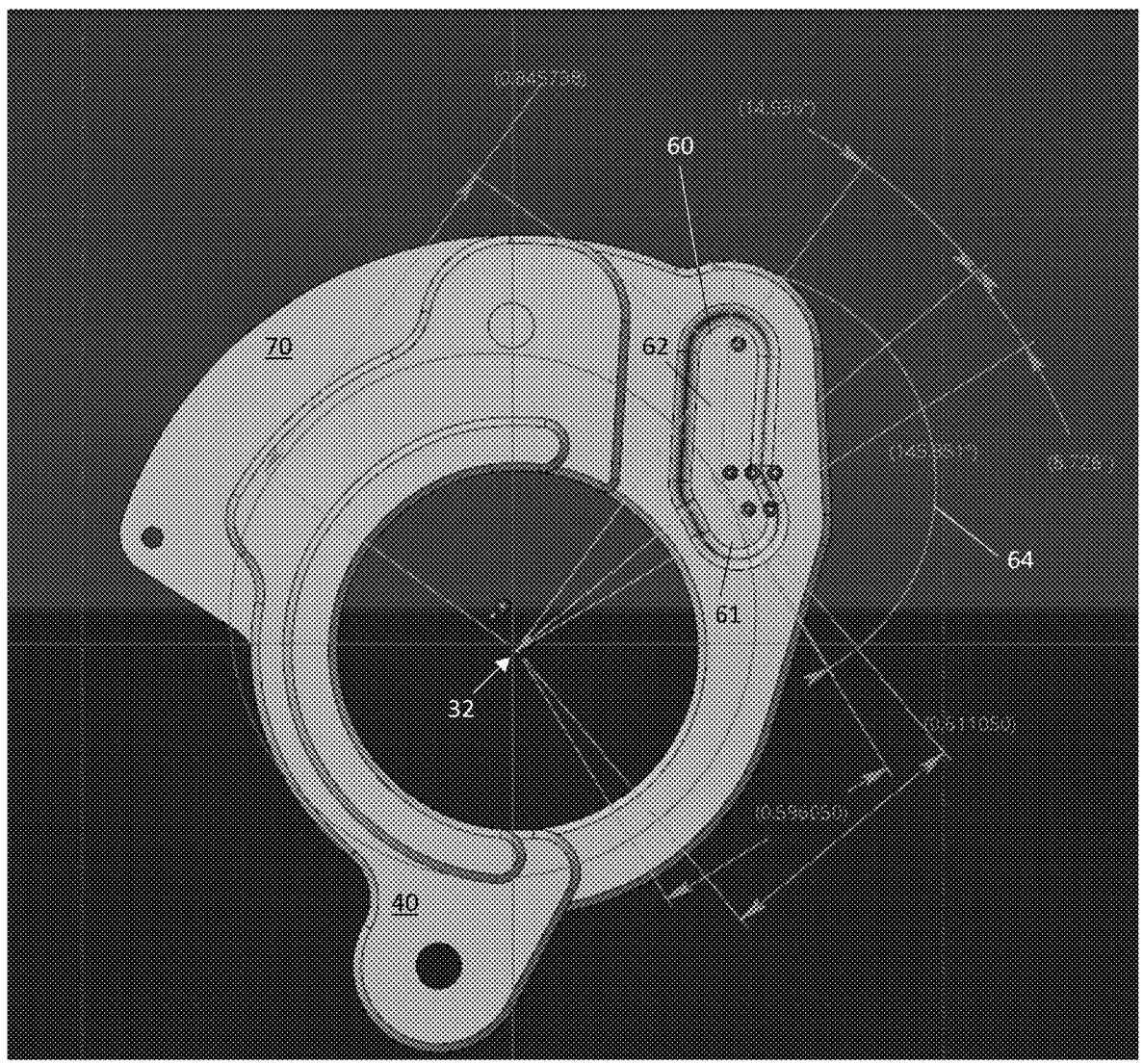
FIG. 6 is a side view of a motion-translation component of a locking mechanism according to some embodiments.
Figure 7A:
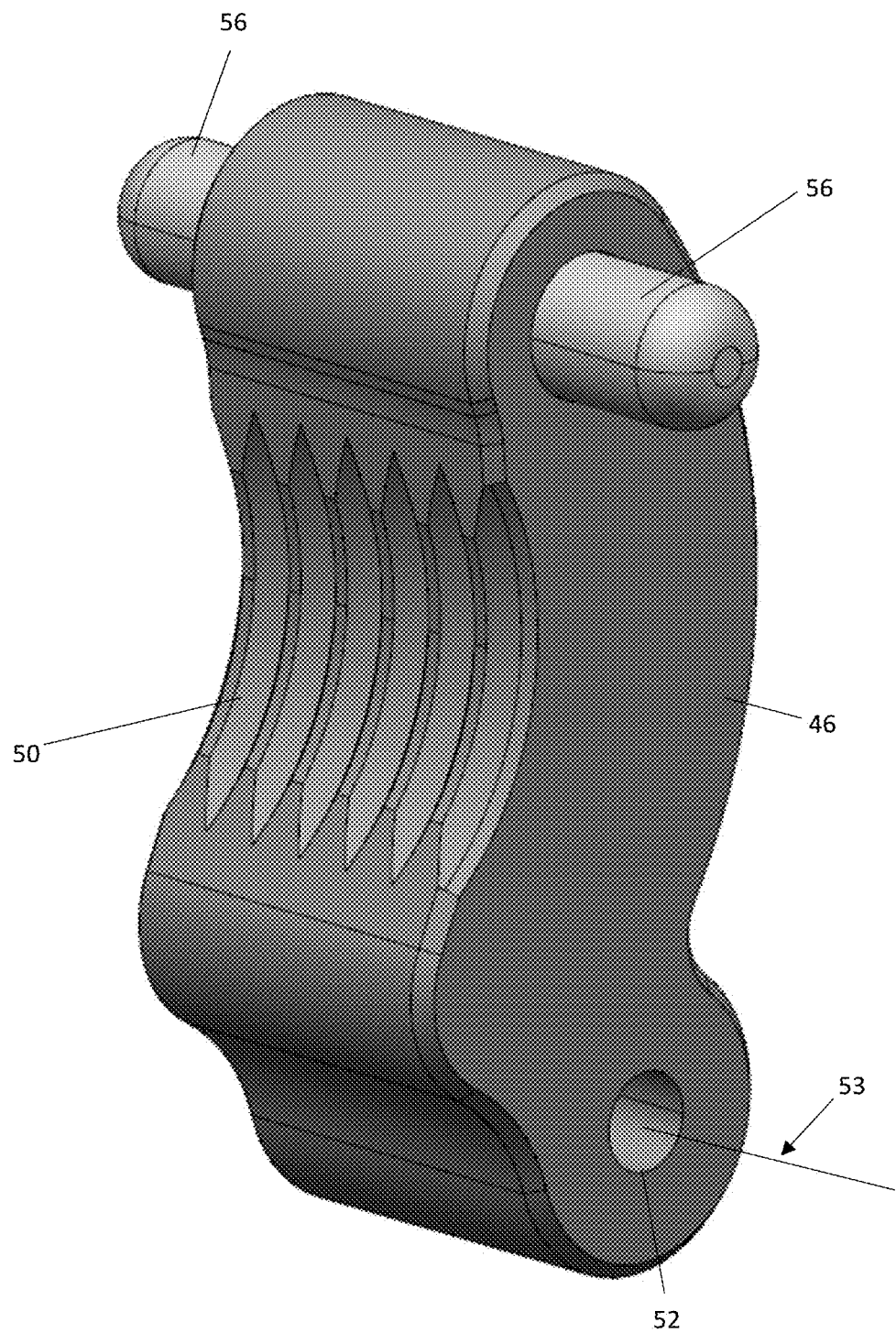
FIG. 7A is a perspective view of a radial lock pawl of a locking mechanism according to some embodiments.
Figure 7B:
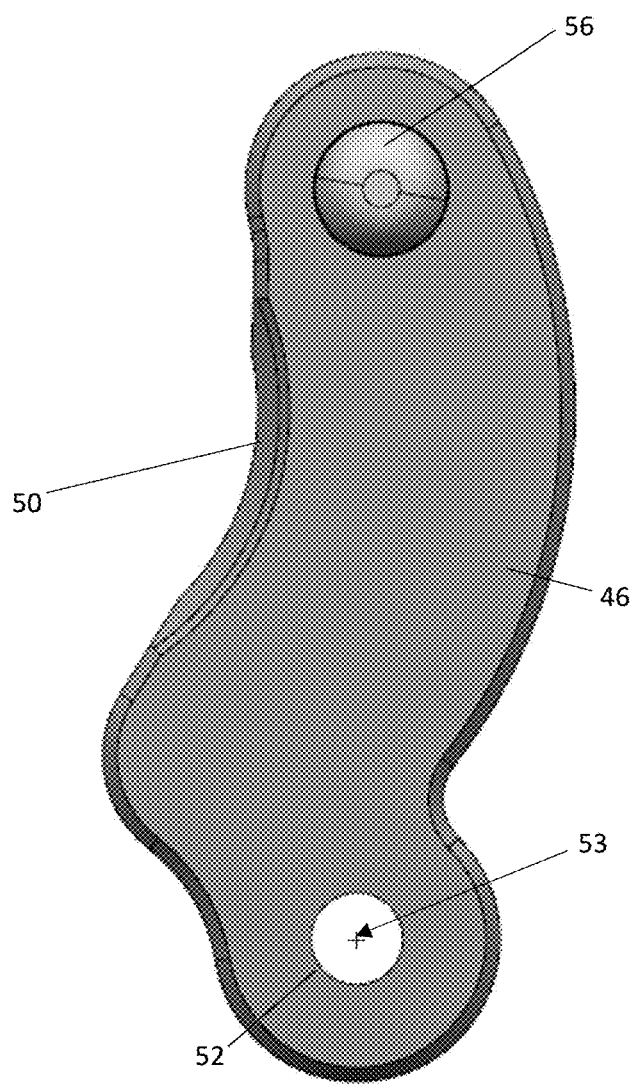
FIG. 7B is a side view of a radial lock pawl of a locking mechanism according to some embodiments.

FIG. 6 is a side view of a control housing 40 portion of the locking mechanism 20 embodiment of FIGS. 1-5B. FIG. 7A is a perspective view of a radial pawl 46 of the locking mechanism 20 embodiment of FIGS. 1-5B. FIG. 7B is a side view of the radial pawl 46 of the locking mechanism 20 embodiment of FIGS. 1-5B and 7A.

In some embodiments, the track tube 22 has a set of convex-curved serrations 48 disposed along a first side of the track tube 22, and each of the convex-curved serrations 48 is located along a partial circumference of the track tube 22 at the first side of the track tube 22. In some embodiments, the radial pawl 46 has a set of concave-curved serrations 50 disposed at a second side of the radial pawl 46, and the set of concave-curved serrations 50 is configured to engage with the set of convex-curved serrations 48 of the track tube 22 to lock a position of the track tube 22 along the track axis 32 relative to the radial pawl 46.

The radial pawl 46 may have a pivot hole 52. The radial pawl 46 may be pivotably or rotatably coupled to the swivel plate 26 by a screw or bolt extending through the pivot hole 52, which acts as a pivot point 53 for the radial pawl 46. The radial pawl 46 may be coupled to the swivel plate 26 via a radial pawl pivot bracket 54, as illustrated in FIG. 1. Alternatively, the radial pawl 46 may be directly coupled to the swivel plate 26, such as by a radial pawl pivot bracket integral with and extending from the swivel plate 26, for example. At the pivot hole 52 or where the radial pawl 46 is pivotably or rotatably coupled to the swivel plate 26, a bushing, bearing, or combination thereof, may be inserted there.

In some embodiments, a pin 56 extends from at least one side of the radial pawl 46, and the pin 56 is separated from the pivot point 53 by a spaced distance. In some embodiments, as illustrated in FIGS. 7A and 7B, the radial pawl 46 may have a first pin 56 portion extending from a first side of the radial pawl 46, a set of curved pawl teeth or serrations 50 disposed on a second side of the radial pawl 46, and a second pin portion 56 extending from a third side of the radial pawl 46. The first pin portion and the second pin 56 portion may be a single integral pin component extending through the radial pawl 46, or may be separate pieces inserted into the respective sides of the radial pawl 46, or may be integral portions of the radial pawl 46 extending from the respective sides of the radial pawl 46.

In some embodiments, at least one control housing 40 portion or motion-translation component is disposed adjacent the radial pawl 46. The control housing 40 portion may be disposed generally concentrically and at least partially about the track axis 32. As illustrated in FIG. 6, a first slot 60 may be formed in the control housing 40 portion. As illustrated in FIGS. 3B, 4B, and 5B, the first slot 60 may be configured for receiving the pin 56 therein when the radial pawl 46 is adjacent the control housing 40 portion. As part of the kinematics of the lock mechanism 20, the first slot 60 may be configured to at least partially constrain motion of the pin 56 such that a pivotal motion of the control housing 40 portion about the track axis 32 is translated by a slider motion of the pin 56 by the first slot 60 to control a rate of angular motion of the radial pawl 46 pivoting about the pivot point 53 of the radial pawl 46. As part of the kinematics of the lock mechanism 20, the first slot 60 may also be configured so that the rate of angular motion of the radial pawl 46 differs from a rate of angular motion of the control housing 40 portion about the track axis 32 for at least part of the pivotal motion of the control housing 40 portion.

In the example embodiment illustrated in FIGS. 1, 3A, 4A, 5A, and 7A, the radial pawl 46 has a pin 56 extending through the radial pawl 46, and the control housing 40 has two control housing portions or motion-translation components. In some embodiments, the radial pawl 46 may be made from CNC machined aluminum billet, and the pin 56 may be made from hardened stainless steel. As illustrated in FIGS. 1-3B, in a locked position, the teeth 50 of the radial pawl 46 mate with or engage with some of the teeth 48 of the track tube 22 so that the track tube 22 becomes releasably fixed relative to the radial pawl 46. In a locked position for the example embodiment illustrated in FIGS. 1-3B, axial forces exerted on the track tube 22 along the track axis 32 are transferred to the radial pawl 46 via the teeth 48, 50, and those forces exerted on the radial pawl 46 are transferred to the swivel plate 26 via the radial pawl 46 pressing against the control housing 40 portion, via the control housing 40 portion pressing against the thrust bushing 44, via the thrust bushing 44 pressing against the control housing pivot mount 34, and via the control housing pivot mount 34 pressing against the pillow block 24. Radial direction forces exerted on the tracking tube 22 may be transferred to the swivel plate 26 via the bearings 28 and pillow blocks 24.

A first slot 60 may be formed in a first side of a first control housing 40 portion. The first pin 56 portion may be disposed in the first slot 60 such that the first side of the radial pawl 46 faces the first side of the first control housing 40 portion. The first slot 60 may have a first inner slot portion 61 and a first outer slot portion 62. The first outer slot portion 62 may extend at a greater radial distance from the track axis 32 than the first inner slot portion 61. A first outer change in radial distance from the track axis 32 per pivot angle about the track axis 32 for the first outer slot portion 62 may be greater than a first inner change in radial distance from the track axis 32 per pivot angle about the track axis 32 for the first inner slot portion 61. A first slot angle 64 formed between the first inner slot portion 61 and the first outer slot portion 62 may be an obtuse angle. The first slot angle 64 may be within an obtuse angle range of about 144 degrees to about 147 degrees, or within an obtuse angle range of 144.85 degrees to 146.85 degrees, for example. In some embodiments, the first slot angle 64 may be 145.85 degrees, as illustrated in FIG. 6. The first outer change in radial distance from the track axis 32 per pivot angle about the track axis 32 for the first outer slot portion 62 may be within a first outer change range of about 0.3 mm/degree to about 0.5 mm/degree. In some embodiments, the first outer change in radial distance from the track axis 32 per pivot angle about the track axis 32 for the first outer slot portion 62 may be 0.399 mm/degree, as illustrated in FIG. 6. The first inner change in radial distance from the track axis 32 per pivot angle about the track axis 32 for the first inner slot portion 61 may be within a first inner change range of about 0.0 mm/degree to about 0.1 mm/degree. In some embodiments, the first inner change in radial distance from the track axis 32 per pivot angle about the track axis 32 for the first inner slot portion 61 may be 0.05 mm/degree, as illustrated in FIG. 6. The inner slot portion 61 may be linear, arced, curved, or any combination thereof. Similarly, the outer slot portion 62 may be linear, arced, curved, or any combination thereof. In some embodiments, there may not be an abrupt slot angle between the inner slot portion 61 and the outer slot portion 62 of the slot 60, such that there is a smooth or curved or arced transition rather than a clearly defined angle. In some embodiments, there may be more than two slot portions for the slot 60. Stated another way, the slot 60 may be segmented or parsed into any number of slot portions with transitions that are angular, smooth, curved, or any combinations thereof, for example.

A spring 66 may be coupled to either of or both of the control housing 40 portions. The spring 66 may be coupled to a second control housing 40 portion at a spaced distance 68 from the track axis 32, as illustrated in FIG. 3A for example. The spring 66 may be configured to bias or force the second control housing 40 portion such that the first pin 56 portion is held in the first inner slot portion 61 and such that the set of curved pawl teeth 50 of radial pawl 46 mate with a subset of the set of curved track teeth 48 of the track tube 22 to lock a position of the track tube 22 relative to the radial pawl 46. A lock angle at the track axis 32 between a spring attachment point on the second control housing 40 portion where the spring 66 is coupled to the second control housing 40 portion and the pin 56 of the radial pawl 46 at the locked position may be within a range of about 75 degrees and about 105 degrees, or in some embodiments closer to about 90 degrees as illustrated in FIG. 3A, for example. Such placement of the spring attachment point for the spring 66 may provide a tangential or approximately tangential pulling angle on the second control housing 40 portion at the locked position, which may be advantageous for optimizing or maximizing a force vector for the spring force exerted on the second control housing 40 portion by the spring 66. The spring 66 may be preloaded such that the control housing 40 will achieve sufficient rotation and engagement with the radial pawl 46. The mechanical advantage of the lock mechanism 20 may be designed to be optimized during the lower range of the slot 60 at the inner slot portion 61. As the control housing 40 rotates to an angular deflection consistent with the radial pawl 46 interacting with the upper range of the slot 60, such as after rotating 8.73-degrees from zero, for example, the mechanical advantage of the spring force may start decreasing. This may be due to the spring force application angle diverging away from being tangential, which may be good because it can reduce magnitude of cable force required to rotate the control housing 40 toward the fully disengaged position.

Either, or both, of the control housing 40 portions may have a cable pulley or cable pulley portion 70 extending therefrom or formed therein. In some embodiments, the first control housing 40 portion may have a cable pulley channel 70 integrally formed therein, as illustrated in FIG. 1, for example. In some embodiments, the cable pulley 70 may be a separate component attached to either of the control housing 40 portions, such as by using screws, bolts, rivets, adhesive, welding, or any combination thereof. A pull cable 72 may be coupled to the cable pulley 70, as illustrated in FIG. 1, for actuating the locking mechanism 20 by a user or by another device. One of the control housing pivot mounts 34 may have an idler cable pulley 74 to ensure that the pull cable 72 remains aligned with and on the cable pulley 70, or to guide or tension the pull cable 72. In some embodiments, a lever portion, lever arm, lever linkage, gear, ring, pinion, or some combination thereof, may be used instead of or in addition to a cable pulley 70 and a pull cable 72, for example.

In FIGS. 3A and 3B, in a locked position, as the control housing 40 portions are rotated or pivoted counterclockwise by the force of the spring 66, per the orientation shown in the figures, the first slot 60 of the first control housing 40 portion and the second slot 60 of the second control housing 40 portion constrain the motion of the pin 56 of the radial pawl 46 within the inner slot portions 61, which tilts or pivots the radial pawl 46 toward the track tube 22. Due to the small change in radial distance from the track axis 32 per pivot angle about the track axis 32 within the inner slot portions 61, the spring force sufficient to retain the locked position and to prevent back drive may not be large because of the mechanical advantage provided by the kinematics of the lock mechanism 20. A smaller spring force may be an advantage provided by some embodiments because the force by a user, or another device, on the pull cable 72 to disengage the lock mechanism 20 can be less, which makes the lock mechanism 20 easier to operate for a user or another device. Also, a smaller spring 66 saves weight and may be easier to install during manufacturing than a larger, stiffer, or stronger spring, which may be an advantage provide by some embodiments.

FIGS. 4A and 4B illustrate a position due to a force applied to the pull cable 72 by a user or by another device, such as a electric motor, servo, solenoid, actuator, lever, or linkage, to overcome the force of the spring 66 and to rotate or pivot the control housing 40 portions clockwise, per the orientation shown in the figures, which causes the pin 56 of the radial pawl 46 to be guided into the outer slot portions 62, which thereby causes a clockwise rotation or pivot, per the orientation shown in the figures, of the radial pawl 46, and which causes the teeth 50 of the radial pawl 46 to partially disengage from the teeth 48 of the track tube 22. Because it may be preferred or desired to disengage the teeth 50 of the radial pawl 46 more rapidly per a same, constant, or steady pulling motion of the pull cable 72, to avoid or minimize the teeth 48 of the track tube 22 grinding and wearing against the teeth 50 of the radial pawl 46, the outer slot portions 62 may have a different slope than the inner slot portions 61. In other words, once a disengagement is initiated, it may be preferred or desired to exit the relatively flatter slope of the inner slot portions 61 within a short cable pull distance and enter the relatively steeper slope of the outer slot portions 62 so that the disengagement of the teeth 50 of the radial pawl 46 occurs faster, to avoid teeth damage and wear.

FIGS. 5A and 5B illustrate a disengaged or unlocked position due to continued force applied to the pull cable 72 to continue to overcome the force of the spring 66 and to further rotate or pivot the control housing 40 portions clockwise, per the orientation shown in the figures, which causes the pin 56 of the radial pawl 46 to be further guided radially outward in the outer slot portions 62, which thereby causes a further clockwise rotation or pivot, per the orientation shown in the figures, of the radial pawl 46, and which causes the teeth 50 of the radial pawl 46 to fully disengage from the teeth 48 of the track tube 22. As illustrated in FIG. 5B, at a more, near a most, or at a most radial extent of the pin 56 within the outer slot portions 62, the teeth 50 of the radial pawl 46, as well as the entirety of the radial pawl 46, may be fully clear of the track tube 22, to allow axial movement of the track tube 22 along the track axis 32 without hinderance or interference of the radial pawl 46. Such design may deflect the radial pawl 46 such that no portion of the radial pawl 46 extends into the inner diameter of the control housing 40, for example. The upper range or the outer slot portion 62 may be a linear section having constantly increasing radii. A linear section may be preferred or desired in some embodiments to simplify the force distribution during the disengagement portion of operation. The upper range or the outer slot portion 62 may have a steep slope that accelerates the rotational deflection of the radial pawl 46 to ensure disengagement with the track tube 22. The slope of the outer slot portion 62 may be such that a large or maximum amount of force is applied onto the radial pawl 46 to allow for disengagement with the track tube 22.

For the embodiment shown in FIGS. 4A and 4B, viewing the position shown in FIGS. 3A and 3B as zero degrees as a reference point, the control housing 40 is rotated or pivoted about midway through disengagement at an angle of about 11.8 degrees. And for the embodiment shown in FIGS. 5A and 5B, viewing the position shown in FIGS. 3A and 3B as zero degrees as a reference point, the control housing 40 is rotated or pivoted to full disengagement at an angle of about 23.6 degrees.

FIG. 6 illustrates measurements of an inner slot portion 61 and an outer slot portion 62 for a slot 60 of an example embodiment relative to a central rotational axis or pivot point of a control housing 40 portion, which may align with or closely align with a track axis 32 of a track tube 22, as points of reference. For the embodiment shown in FIG. 6, the inner slot portion 61 provides a change of radius from 0.596050 inch to 0.611050 inch over a range of angular motion of 8.726 degrees for the center of the pin 56 to move in the inner slot portion 61, for example. And for the embodiment shown in FIG. 6, the outer slot portion 62 provides a change of radius from 0.611050 inch to 0.845738 inch over a range of angular motion of 14.936 degrees for the center of the pin 56 to move in the outer slot portion 62, for example. And for the embodiment shown in FIG. 6, the obtuse angle 64 between the inner slot portion 61 and the outer slot portion 62 is 145.851 degrees, for example. Due to the are of the lower range or the inner slot portion 61, the angle between the L-shaped slot portions 61, 62 may change with position. If a line tangent is made to the are of the inner slot portion 61 at the point where the two slot legs intersect, then the angle 64 may be measured as 145.85 degrees, for example. In some embodiments, a range of the angle 64 formed where the inner slot portion 61 and the outer slot portion 62 meet may be primarily driven by an amount of allowable pull cable travel during the engagement and disengagement of the lock mechanism 20. Given an anticipated or typical amount of pull cable travel for an example lock mechanism 20 embodiment, an allowable angle 64 may be in a range between 144.85 and 146.85 degrees, or about 144 to about 147 degrees, for example.

For the embodiment shown in FIGS. 1-6, where the center of the pin 56 is at a radius of 0.60355 inch and an angle of 4.363 degrees into the inner slot portion 61, as illustrated at the position shown in FIGS. 3A and 3B, the teeth 50 of the radial pawl 46 may be fully engaged with teeth 48 of the track tube 22 to provide a fully locked position for the track tube 22 relative to the radial pawl 46, assuming perfect alignment, tolerances, and sizing of all the components and pivot axes. The inner slot portion 61 may provide for additional radial movement of the pin 56 toward the track tube 22 by additional rotation of the control housing 40 portions, which provides for some margin to account for misalignment, inaccurate tolerances, and inaccurate sizing for components, or for wear of parts over time. In some embodiments, additional range may be provided for the length or extent of the inner slot portion 61 and the outer slot portion 62 to provide some margin to account for manufacture errors and inaccuracies. The lower range of the inner slot portion 61 may be an arc with a shallow slope, such as having the radius reducing at a slower rate and approaching tangential, and may be designed to apply maximum compression on the radial pawl 46 at the locked position. The radius of the inner slot portion 61 may be designed to continue decreasing well beyond an anticipated point of engagement between the radial pawl 46 and the track tube 22 to ensure that engagement occurs. This may be to account for loading on the track tube 22 that may result in a relative position of the track tube 22 being somewhat inconsistent, which may also depend on the allow flexing or deformation of various components of the seat structure, for example.

As shown in FIG. 7A, the serrations or teeth 50 of the radial pawl 46 may be blunted or flattened at the tips to aid in clearance during disengagement and to reduce interference of deformations and damage during engagement, for example. The curvature and radius of the teeth 50 of the radial pawl 46 may match or closely match the curvature and radius of the teeth 48 on the track tube 22 so that the teeth 48, 50 mate or engage well at a locked position.

Figure 8A:
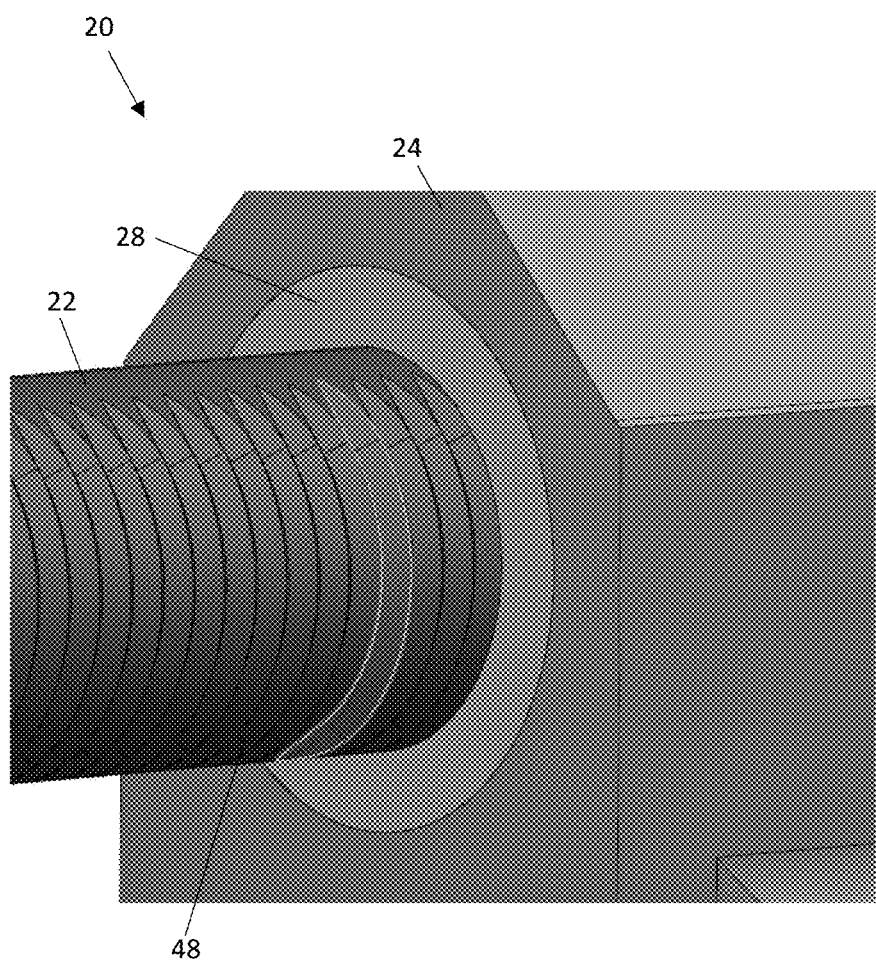
FIG. 8A is a perspective view illustrating a track tube of a locking mechanism according to some embodiments.
Figure 8B:
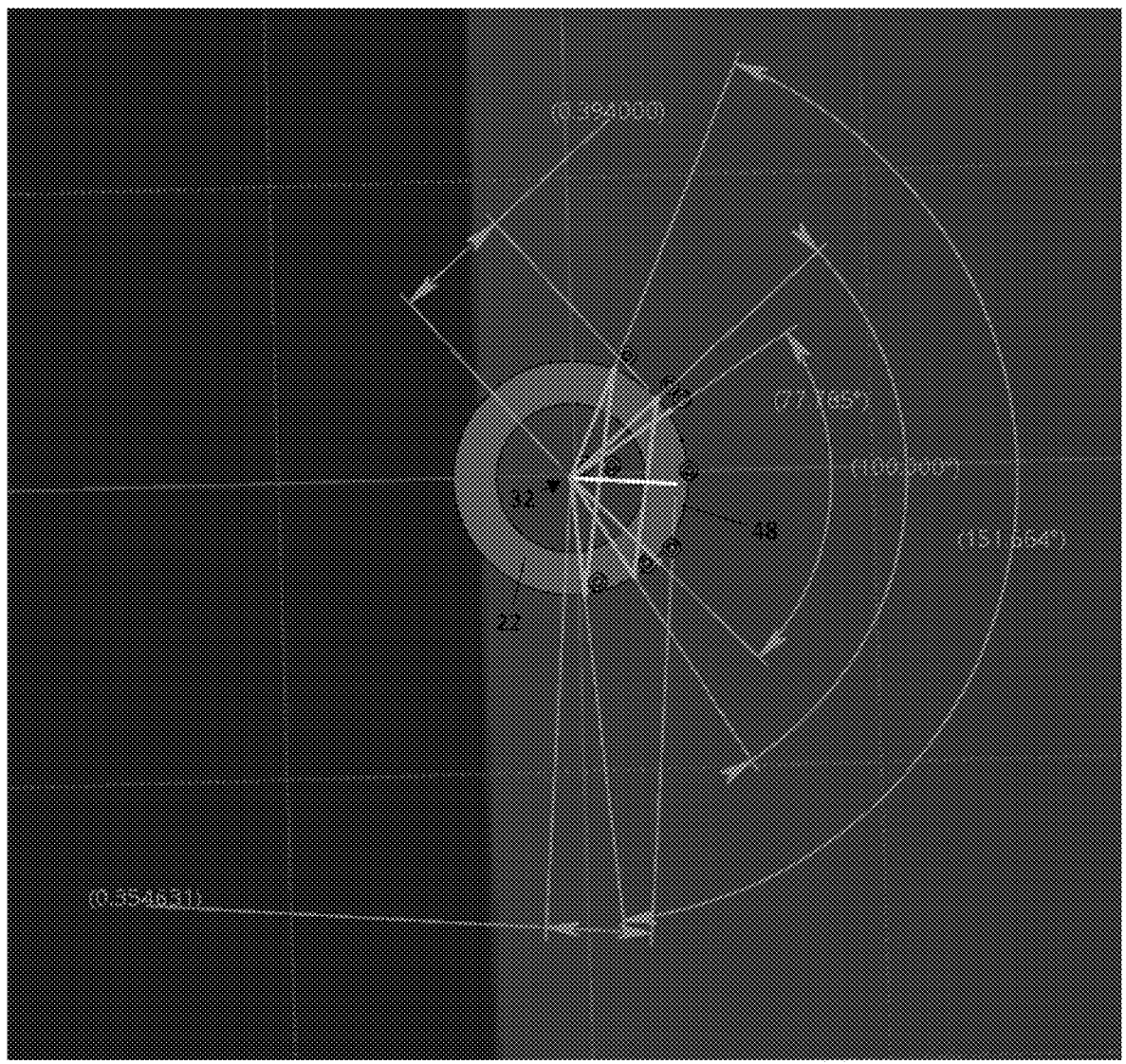
FIG. 8B is cross-section view of a track tube of a locking mechanism according to some embodiments.

FIG. 8A is a perspective view illustrating and focusing on the track tube 22 of the locking mechanism 20 embodiment of FIGS. 1-5B. FIG. 8B is cross-section view of the track tube 22 of FIG. 8A. FIG. 8B illustrates measurements of serrations 48 of a track tube 22 of an example embodiment relative to a central rotational axis or pivot point or track axis 32 of the track tube 22, as a point of reference. For the embodiment shown in FIGS. 8 and 9, for a track tube 22 having an outer diameter of 0.788000 inch, or 20.015 mm, the serrations 48 extend along part of the circumference of the track tube 22 at an angular extent of 151.664 degrees, or about 152 degrees, including the full tapering extents of the serrations 48, and the serrations 48 have a full depth and size of 0.039369 inch, or 1 mm, at an angular extent of 100 degrees. In some embodiments, the angular extent of the serrations 48 of the track tube 22 may be designed with extra arclength relative to the arclengths for the serrations 50 on the radial pawl 46, to account for angular tracking tube deflection and other operational variables. In some embodiments, the serrations 48 extend along part of the circumference of the track tube 22 with the serrations 48 at a full depth at an angular extent of between about 85 degrees and about 100 degrees, for example. In the embodiment illustrated in FIGS. 7A and 7B, the teeth 50 of the radial pawl 46 at full depth and size have an angular extent of 77.785 degrees, or about 78 degrees, which is marked on FIG. 8B to show a comparison with the angular extent of the full depth serrations 48 of the track tube 22. Such overlap in angular extent may provide for margin of rotational misalignment of the track tube 22 relative to the other components of the lock mechanism 20, particularly the teeth 50 of the radial pawl 46, and such overlap may vary for other embodiments. Furthermore, the shape, size, and angles of serrations or teeth 48, 50 for the track tube 22 and the radial pawl 46 may vary for other embodiments, such as being slanted or even wavy or zig-zag shaped, along the circumferential direction.

In some embodiments, a track tube 22, a pillow block 24, a swivel plate 26, a control housing pivot mount 34, a control housing 40 portion, a motion-translation component 40, a bushing 44, a radial pawl 46, a pin 56, a slot insert, a cable pulley 70, any combination thereof, and any selection thereof, may be made from any suitable material or alternative materials, as a single integral piece or as a multi-piece component, such as steel, stainless steel, aluminum, titanium, bronze, brass, nickel, magnesium, carbon fiber reinforced polymers (CFRP), forged carbon composite, carbon nanotube composites (CNT), fiberglass reinforced polymers (FRP), glass fiber reinforced polymer (GFRP), aramid fiber composite, natural fiber composites, basalt fiber composite, metal matrix composite, woven composite, ceramic matrix composite (CMC), thermoplastic composites, various alloys thereof, various forgings thereof, or combinations thereof, for example.

The track tube 22 may be supported by linear bearings 28, as illustrated in FIG. 2, or other alternative supports, such as metal bushings, hardened stainless steel bushings, bronze bushings, polytetrafluoroethylene (PTFE) bushings, solid bushings, split bushings, flanged bushings, thrust washers, needle roller bushings, roller bearing thrust washers, linear bushings, oil-impregnated bushings, self-lubricating bushings, tapered bushings, roller bearings, cylindrical roller bearings, tapered roller bearings, spherical roller bearings, needle bearings, thrust bearings, sleeve bearings, angular contact bearings, mounted bearings, spherical plain bearings, flexure bearings, or any combination thereof, for example.

In some embodiments, the control housing 40 portions may be rotatably or pivotably coupled to the control housing pivot mounts 34 or to the swivel plate 26 by any of a variety of supports or other alternative supports, such as metal bushings, hardened stainless steel bushings, bronze bushings, polytetrafluoroethylene (PTFE) bushings, solid bushings, split bushings, flanged bushings, thrust washers, needle roller bushings, roller bearing thrust washers, linear bushings, oil-impregnated bushings, self-lubricating bushings, tapered bushings, roller bearings, cylindrical roller bearings, tapered roller bearings, spherical roller bearings, needle bearings, thrust bearings, sleeve bearings, angular contact bearings, mounted bearings, spherical plain bearings, flexure bearings, or any combination thereof, for example.

In some embodiments, a track tube 22, a pillow block 24, a swivel plate 26, a control housing pivot mount 34, a control housing 40 portion, a motion-translation component 40, a bushing 44, a radial pawl 46, a pin 56, a slot insert, a cable pulley 70, any combination thereof, and any selection thereof, may be manufactured using any suitable manufacturing technique(s) or tool(s) or alternative technique(s), such as injection molding, thermal molding, casting, vacuum molding, forging, CNC, lathes, endmills, angled cutters, or any combination thereof, for example. In some embodiments, components may be permanently, releasably, or removably fixed, attached, assembled, or coupled together directly or with intervening components, seals, gaskets, or layers, using any suitable way or alternative ways, such as by using screws, bolts, rivets, adhesive, snaps, clips, clamps, press fit, hook-and-loop fasteners, latches and catches, bayonet, thermal bonding, crimping, threaded inserts, welding, or any combination thereof, for example.

An advantage of some embodiments may be that the lock mechanism 20 allows a seat adjustment with a low cable force. An advantage of some embodiments may be that the curved serrations 48, 50 provide greater surface area on the materials that prevent motion under high loads. An advantage of some embodiments may be that the lock mechanism 20 may provide equal resistance in both direction of motion without requiring multiple instances because traditional flat-plane serrated pawl locking mechanisms are designed to only handle one direction at a time.

In some embodiments, the curved pawl locking mechanism 20 may be engaged and disengaged through the rotation of a control housing 40 that interacts with the curved pawl 46 with a ramp interface of the slot 60. In some embodiments, the curved pawl 46 may be secured to the swivel plate 26 with a single bolt, at the pivot point 53, that runs parallel with the track tube 22 or track axis 32, and as the curved pawl 46 rotates, it engages with the curved serrations 48 in the track tube 22. This mechanical interaction may require the curved pawl 46 to rotate past a certain angular deflection before the teeth 48, 50 can fully disengage. As the control housing 40 rotates, the ramp interface of the slot 60 may interact with the curved pawl 46 and causes the pawl 46 to pivot and disengage the teeth 48, 50, thus allowing the seat to track freely. A spring 66 may be secured to the control housing 40 and swivel plate 26 that may result in the curved pawl 46 being compressed into the track tube 22. Disengagement may be controlled with a cable sheeve interface that outputs a cable 72 at a set height with the assistance of a pulley 74. The curved serrations 48, 50 of both the curved pawl 46 and tracking tube 22 may be at a depth of 1 mm with a serration angle of 70 degrees, for example, whereas some prior flat-plane serrated mechanisms may have used serrations or teeth with a depth of 0.5 mm and with an tooth angle of 90 degrees. This may allow for a reduction in forces that act to push the curved pawl 46 away from the track tube 22, reducing back drive, and may transfer that loading into the direction of motion. This alteration compared to prior systems may provide a more efficient distribution of forces that reduces the amount of compression that the curved pawl 46 needs to stay engaged with the track tube 22, which may provide an advantage of reduced spring force required by the spring 66 to retain a locked position and less cable pull force required to disengage the lock mechanism 20 by a user or another actuation device.

Serrations 48 following an outer surface of the track tube 22 with a depth of 1 mm and a serration angle of 70 degrees may provide advantages of increasing surface area of interacting material, between the curved pawl 46 and the tracking tube 22, and improving load transferring mechanics. An advantage of some embodiments may be that curved serrations 48, 50 allow for the track tube 22 to be installed or rotated axially, such as rotational misalignment, without influencing the effectiveness of the locking mechanism 20.

The control housing assembly 40 may be inserted between inboard and outboard pivot mounts 34. The pivot mounts 34 may be static fixtures that allow the control housing assembly 40 to freely rotate or pivot as needed for operation. Bushing or bearings 44 may be used to reduce the frictional forces related to rotation of the control housing assembly 40. The pivot mounts 34 may be installed to the swivel plate 26 via screws or bolts, which may be used to position the control housing assembly 40, and less for or not to take loading. Positioning of the control housing assembly 40 may be for reducing or eliminating the possibility of rubbing against the track tube 22. Rubbing of any component against the track tube 22 may result in increased resistance in motion and wear.

A pulley 74 may be secured to one of the pivot mounts 34 that interacts with the control cable 72 as it leaves the control housing cable sheeve 70. If the control cable 72 cannot be pulled at a tangential position due to size constraints or orientation of the lock mechanism 20, a pulley 74 may be used to provide a more convenient pulling location, which can provide an advantage of more flexibility of the cable pull location in the design of the seat structure, for example.

The control housing assembly or motion-translation components 40 may be a mechanism that interacts with the curved pawl 46 to engage and disengage the track locking system. The control housing assembly 40 may be composed of an inboard side and an outboard side. This may be useful or desirable due to the way that the curved pawl 46 interacts with the control housing ramps in the slots 60. The curved pawl 46 may have an axle or pin 56 that extends into ramps of the slots 60 on both inboard and outboard halves of the control housing assembly 40.

Figure 9A:
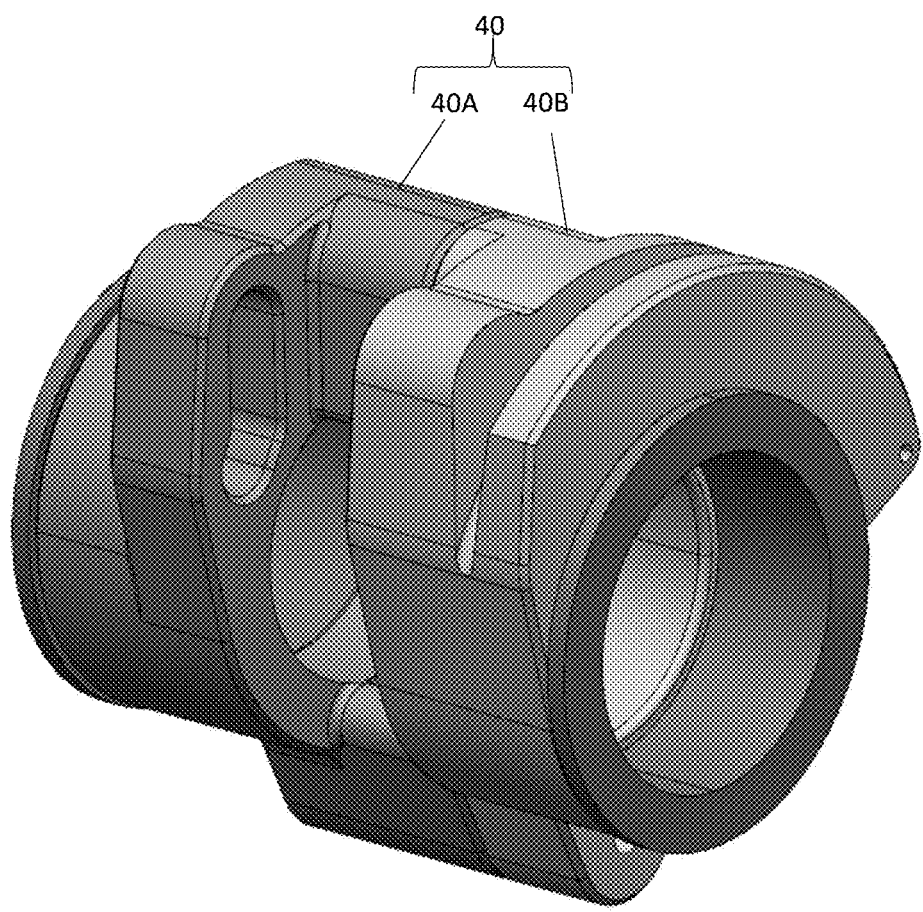
FIG. 9A is a perspective view of a control housing assembly of a locking mechanism according to some embodiments.
Figure 9B:
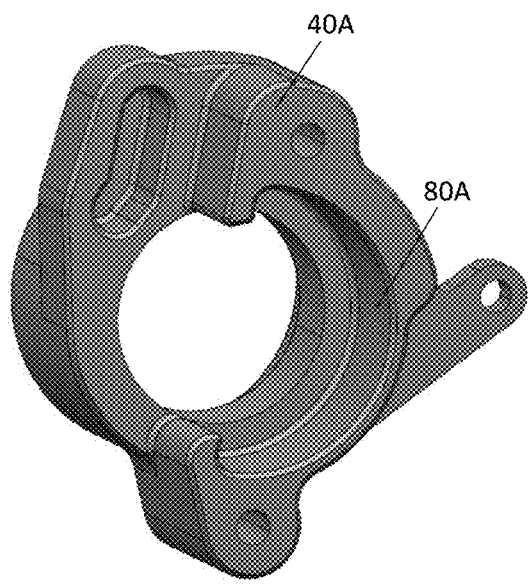
FIG. 9B is a perspective view of a first control housing portion of the control housing assembly of FIG. 9A according to some embodiments.
Figure 9C:
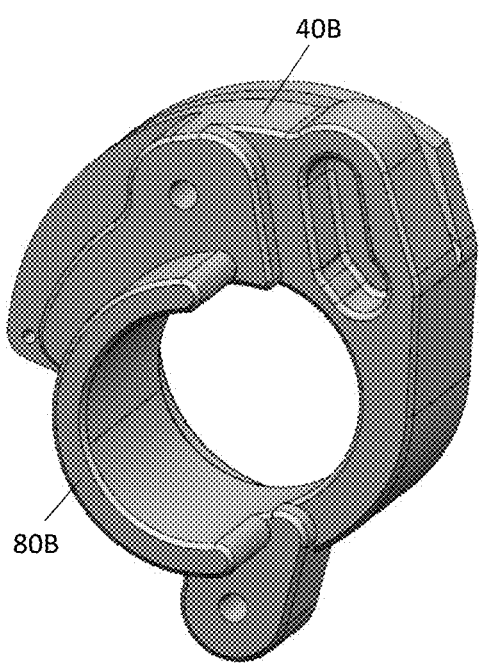
FIG. 9C is a perspective view of a second control housing portion of the control housing assembly of FIG. 9A according to some embodiments.
Figure 9D:
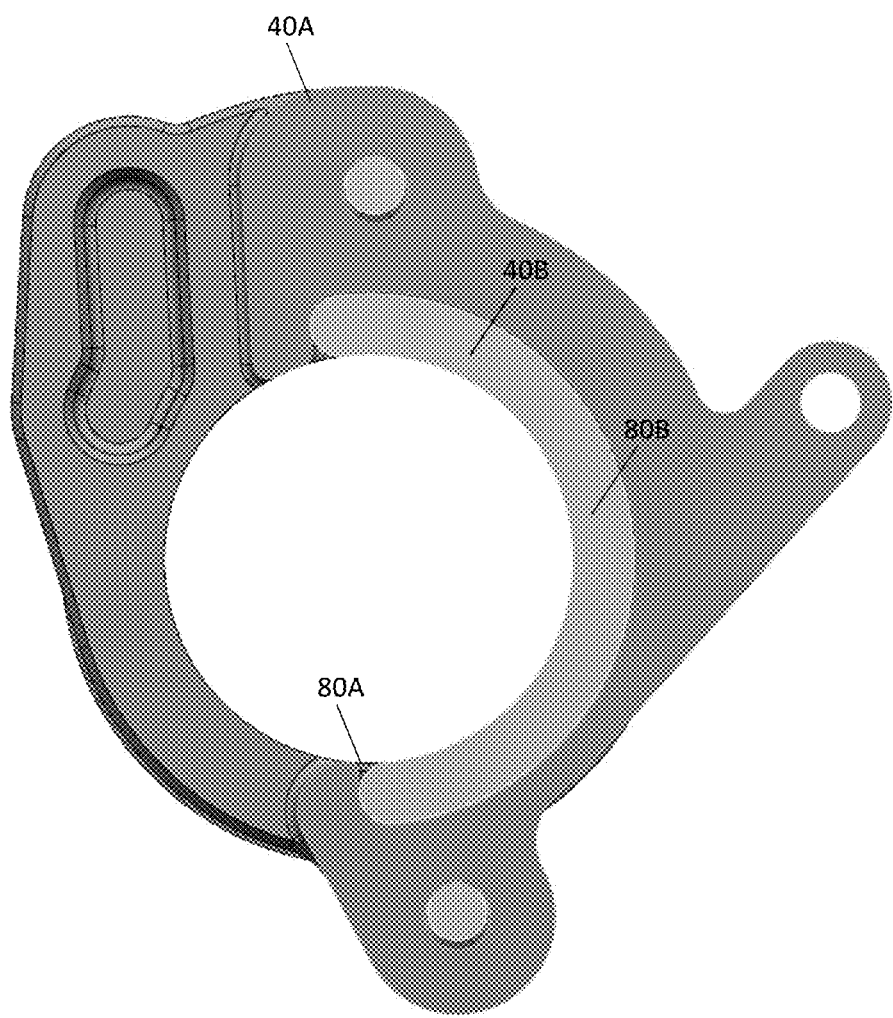
FIG. 9D is a side view of the first control housing portion and a cross-section view of part of the second control housing portion of the control housing assembly of FIG. 9A according to some embodiments.

FIG. 9A is a perspective view of a control housing assembly 40 of a locking mechanism 20 according to some embodiments. FIG. 9B is a perspective view of a first control housing portion 40A of the control housing assembly 40 of FIG. 9A. FIG. 9C is a perspective view of a second control housing portion 40B of the control housing assembly 40 of FIG. 9A. FIG. 9D is a side view of the first control housing portion 40A and a cross-section view of part of the second control housing portion 40B of the control housing assembly 40 of FIG. 9A.

The two halves 40A, 40B of the control housing assembly 40 may be secured together with two screws or two bolts that run parallel with the tracking tube 22. Alignment of both halves 40A, 40B may be best because both ramps of both slots 60 engage with the curved pawl control axle together to prevent or reduce uneven force distribution. Unique male to female mating features may ensure proper alignment during assembly and operation. For example, as illustrated in FIGS. 9B and 9C, the first control housing portion 40A has a female mating feature 80A, and the second control housing portion 40B has a male mating feature 80B. The male mating feature 80B may be configured to fit with, engage with, or mate with the female mating feature 80A, as illustrated in FIG. 9D. Such mating of these features 80A, 80B can ensure that the first control housing portion 40A and the second control housing portion 40B are aligned properly during assembly. This can ensure that both sides of the ramp interface 60 are clocked/coupled such that they both rotate together and interact with the radial pawl pin 56 simultaneously. In other embodiments, other shapes or configurations of mating features may be used to ensure that the first control housing portion 40A and the second control housing portion 40B are aligned properly during assembly, while in some embodiments such mating features may be omitted. Force distribution may be designed to flow axially, which may allow for thin wall thicknesses to be used, as a weight savings advantage.

Both halves of the control housing assembly 40 have a ramp 60 that may interact with the curved pawl 46. The ramp or slot 60 may be a curve that starts at a smaller radius and increases to a larger radius. The slope of the curve for the ramp or slot 60 may flatten out near the smaller radius region to minimize the tangential reactionary force that attempts to disengage the curved pawl teeth 50, and thereby may reduce back drive. The ramp or slot 60 may feature two or more stages of functionality. A lower range or slot portion 61 of the ramp or slot 60 may have a shallow slope designed to apply maximum compression on the pawl 46 against the track tube 22 at a locked position. An upper range or slot portion 62 of the ramp or slot 60 may have a steep slope that accelerates the rotational deflection of the pawl 46 to ensure disengagement with the track tube 22. The ramp or slot 60 may translate relative rotational position of the control housing assembly 40 into an angular deflection of the curved pawl 46. The control axle or pin 56 of the curved pawl 46 may be placed at a constant distance from the pivot point 53 of the curved pawl 46, located on or at the swivel plate 26.

As the control housing assembly 40 rotates, the relative position of the axle or pin 56 may be moved away from the track tube 22 at some radius measured from track axis 32. A smaller radius at the inner slot portion 61 may result in engagement of the teeth 50 of the curved pawl 46 and the teeth 48 of the track tube 22. A larger radius at the outer slot portion 62 may result in the disengagement of the curved pawl 46. Disengagement of the curved pawl 46 may be only occur if the control housing assembly 40 is rotated, or material is deformed. The reactionary forces seen by the curved pawl 46 may be applied at an almost perpendicular angle on the control housing ramp of the slot 60. This may allow for a weak or small force spring 66 to counteract a strong or large axial load.

One half of the control housing assembly 40 may include a constant radius cable sheeve for a pulley 70 that rotates the control housing assembly 40 when a cable 72 attached thereto is pulled. This feature may minimize or reduce the possibility of the cable 72 getting unseated or damaged under repeated cycles. A spring 66 may be secured to the control housing assembly 40 and the swivel plate 26 to apply compression force by the curved pawl 46 onto the track tube 22. Without tension or sufficient tension exerted in the control cable 72, the system engages the curved teeth 48, 50 to prevent motion of the track tube 22 relative to the swivel plate 26.

The curved pawl 46 may directly interact with the tracking tube 22. The curved pawl 46 may have an interior radius with serrations 50 that match the serrations 48 on the track tube 22. The geometry and termination of the serrations 50 may be specifically designed to prevent several common scenarios. The outer most edges of the serrations 50 may be removed such that the edges do not touch during full engagement, which may prevent the teeth 50 of the pawl 46 from bottoming out on the teeth 48 of the track tube 22. Different radii of the pawl 46 may travel different arclengths during engagement and disengagement. Points closer to the axis of rotation for the pawl 46 may move less than points farther away. The pawl 46 may be shaped with a specified serration termination angle to prevent teeth 50 from dragging on the track tube 22 during disengagement of the pawl 46 and moving of the track tube 22.

The pawl 46 may have a control axle or pin 56 that makes direct contact with the ramps 60 of the control housing assembly 40. The control axle or pin 56 may extend beyond both faces of the pawl body and into the ramp enclosures of the slot 60 on the control house assembly 40. One, expected or desired, condition of system failure and disengagement may require the axle 56 to be sheared, such as for an accident failure or shearing point by design. The axle 56 may be made of a high strength steel to prevent deformation. The axle 56 may be sized slightly smaller than the mounting hole to allow it to roll on the ramp surface of the slot 60, as the axle 56 rotates within the pawl 46 or relative to the pawl 46.

The pawl 46 may be mounted onto the swivel plate 26 with a screw or bolt running parallel to or generally parallel to the track tube 22 or the track axis 32. A bushing or bearing may be used to reduce friction and wear from repeated cycling at the pivot point 53 for the pawl 46. The pivot point 53 of the pawl 46 may ensure that the pawl 46 rotates or pivots on a plane perpendicular with a direction of motion of the track tube 22. Spacing may be allowed on the inboard and outboard sides of the pivot interface (at or near point 53) such that some lateral travel is allowed. Most or all of the lateral loading may be intended to be transferred to the control housing 40, rather than the pivot point 53 or pivot connection point for the pawl 46. The expected loading that this pivot point 53 will experience may be related to or mostly related to the tangential and radial components required to keep the serrated teeth 48, 50 engaged.

For force analysis, the swivel plate 26 may be treated as the static reference frame that allows summation of tracking forces to be zero. The tracking tube 22 may be a non-static reference frame that interacts with the swivel plate 26. The tracking lock mechanism 20 may be a system that mounts onto a static reference frame, and that either prevents or allows motion of the tracking tube 22 relative to such static reference frame. Regarding distribution of forces for the applied loading, axial loading may refer to the force experienced in the direction of motion, which may be the force experienced if a seat tracks inboard or outboard, or forward or backward, for example. Radial loading may refer to forces exerted in a radial direction away from the center of a curve, which may describe the force interactions between the curved serrations 50 on the pawl 46 and the curved serrations 48 on the tracking tube 22. Tangential loading may refer to the forces that act in a direction tangent to a curved path, which may describe the force interaction between the curved pawl axle 56 and the control housing ramp interface of the slot 60.

Regarding part interactions for a loading in an inboard direction, the tracking tube 22 may apply axial loading in the inboard motion. The curved serrations 48 on the tracking tube 22 may exert a force onto the curved serrations 50 of the curved pawl 46. An axial loading component may move in an inboard direction. A radial loading component may attempt to disengage the serrated teeth 48, 50. Radial loading may be balanced by the swivel plate 26 that keeps motion mostly or strictly in the inboard and outboard directions. Radial loading may be distributed equally along the entire interacting serrated surfaces that are engaged. The curved pawl 46 may apply reactionary forces onto the control housing 40 and swivel plate 26. Loading on the control housing 40 may include the faces perpendicular to the direction of inboard motion experiencing axial loads, the pawl's inboard face compressing against the inboard face of the control housing ramp, and the radial component of the loading pushing the pawl 46 away from the tracking tube 22. The pawl control axle or pin 56 may compress against the interior surface of the control housing ramp of the slot 60, and the force may be applied onto the surface with a larger radius. The tangential component of the control axle or pin 56 to ramp of the slot 60 interaction may attempt to rotate the control housing 40. The ramp surface of the slot 60 may follow a curve that goes from a smaller radius to a larger radius. A component of the radial loading may have a non-perpendicular direction. A combination of friction and spring force may prevent the control housing 40 from rotating. The mechanical advantage of these reactionary forces may make it more likely for the material to deform before the spring/frictional forces are overcome.

Loading on the swivel plate 26 may include a radial component of the loading from the pawl 46 to tracking tube 22 may create a non-linear force distribution, and radial resultant forces may act in a direction perpendicular to the direction of motion and as such, a concern of failure may be the shearing of the bolt or axle that secures the pawl 46 to the swivel plate 26. The control housing 40 may apply loading onto the control housing pivot mounts 34 and swivel plate 26. A loading onto the control housing pivot mounts 34 may include an axial loading from the control housing 40 compressing the inboard pivot mount 34, and interaction between the parts may be transferred through an intermediate medium such as a bushing 44 or bearing. Radial loading from the control housing 40 may attempt to create misalignment of the pivot mounts 34. Loading from the pawl 46 may be unbalanced and may cause the pivot mounts 34 to deflect or apply deflection forces. A combination of design considerations may reduce the severity of misalignment. The depth of the serrations on the teeth 48, 50 may compensate for major deflections. The inner diameter of the pivot mount 34 may contact the tracking tube 22, which may provide an upper limit to a magnitude of deflections.

Tangential loading of the control housing 40 may be in the interaction between the control cable 72 and the pivot mount pulley 70. The cable sheeve may transfer linear cable displacement into an arclength that follows a tangential path. The control cable 72 may go from the cable sheeve to the pulley 70 that allows for a more convenient location to apply tension and control over the tracking lock mechanism 20. Loading onto the swivel plate 26 may include the tangential loading produced by the extension spring 66 that applies torque, which compresses the pawl 46.

The control housing pivot mount 34 may apply loading onto the swivel plate 26. Loading onto the swivel plate 26 may include axial loading from the pivot mount 34 transferred onto the swivel plate pillow block 24. Radial loading from the pivot mount 34 may be transferred onto swivel plate mounting features. The swivel plate mounting features may be part of the pillow blocks 24 and may help provide an easy means to maintain alignment during installation. An advantage of some embodiments may be weight savings compared to prior systems, as well as cost savings by use of less materials, for example.

Figure 10:
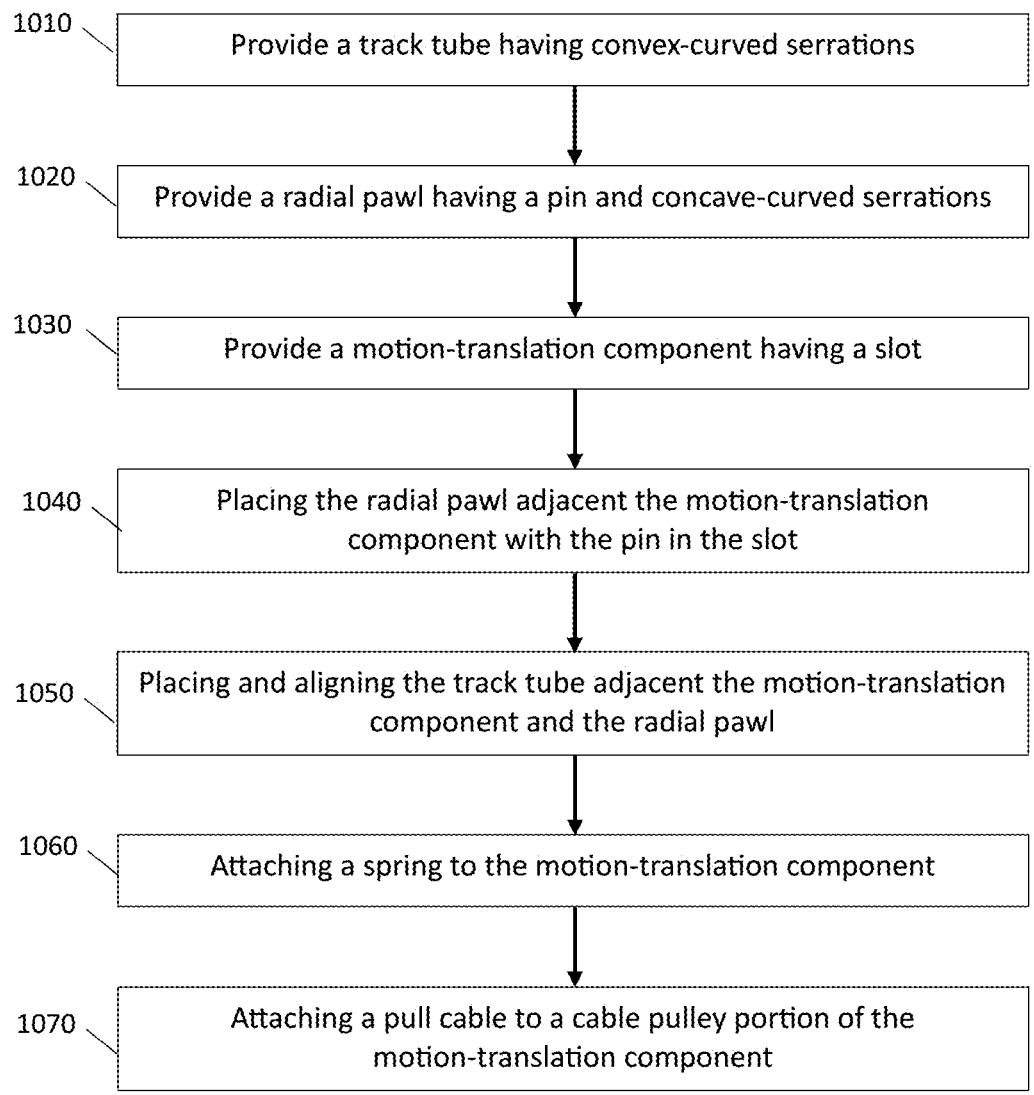
FIG. 10 is a flow chart of a method for installing a position locking apparatus for a seat according to some embodiments.

FIG. 10 is a flow chart of a method for installing a position locking apparatus for a seat according to some embodiments. At operation 1010, a track tube 22 having convex-curved serrations or teeth 48 may be provided. In some embodiments, the track tube 22 may be provided by sourcing, procurement, partial manufacturing of a sourced or procured part, full manufacturing, or some combination thereof, for example.

At operation 1020, a radial pawl 46 having a pin 56 and concave-curved serrations or teeth 50 may be provided. In some embodiments, the radial pawl 46 may be provided by sourcing, procurement, partial manufacturing of a sourced or procured part, full manufacturing, or some combination thereof, for example.

At operation 1030, a motion-translation component 40 having a slot 60 may be provided. In some embodiments, the motion-translation component 40 may be provided by sourcing, procurement, partial manufacturing of a sourced or procured part, full manufacturing, or some combination thereof, for example.

At operation 1040, the radial pawl 46 may be placed adjacent the motion-translation component 40 such that the pin 56 is in the slot 60. In some embodiments, the radial pawl 46 and the motion-translation component 40 may be coupled to a swivel plate 26 of the seat, directly or with intervening components, such as bushings 44, using screws or bolts, for example.

At operation 1050, the track tube 22 may be placed and aligned adjacent the motion-translation component 40 and the radial pawl 46. In some embodiments, the motion-translation component 40 may be generally concentrically aligned with a track axis 32 of the track tube 22, and the track tube 22 may be slidably coupled to the swivel plate 26 of the seat, directly or with intervening components, such as bushings or bearings 28, and the rotational alignment of the track tube 22 may be set by attaching the track tube 22 to a seat bucket structure, directly or with intervening components, using screws or bolts, for example. In some embodiments, the alignment may be sufficient that the concave-curved serrations 50 of the radial pawl 46 are configured to engage with the convex-curved serrations 48 of the track tube 22.

At operation 1060, a spring 66 may be attached or coupled to the motion-translation component 40, directly or with intervening components. In some embodiments, one end of the spring 66 may be attached to the swivel plate 26, directly or with intervening components, and another end of the spring 66 may be attached to a hole or hook of the motion-translation component 40, directly or with intervening components, such that the spring 66 biases a rotation or pivot of the motion-translation component 40 relative to the swivel plate 26 or relative to the track tube 22, for example.

At operation 1070, a pull cable 72 may be attached to a cable pulley 70 portion of the motion-translation component 40, directly or with intervening components. In some embodiments, the pull cable 72 may be looped, latched, fed through a hole, clamped, placed in a groove, thread over other cable pulleys, tensioned, soldered, welded, screwed, bolted, crimped, or any combination thereof, to attach or coupled the pull cable 72 to the cable pulley 70 portion, for example. According to some embodiments, the operations 1010 to 1070 may be sequentially performed, but are not necessarily sequentially performed. For example, the sequence of the operations may be changed, or at least two operations may be performed in parallel.

Figure 11:
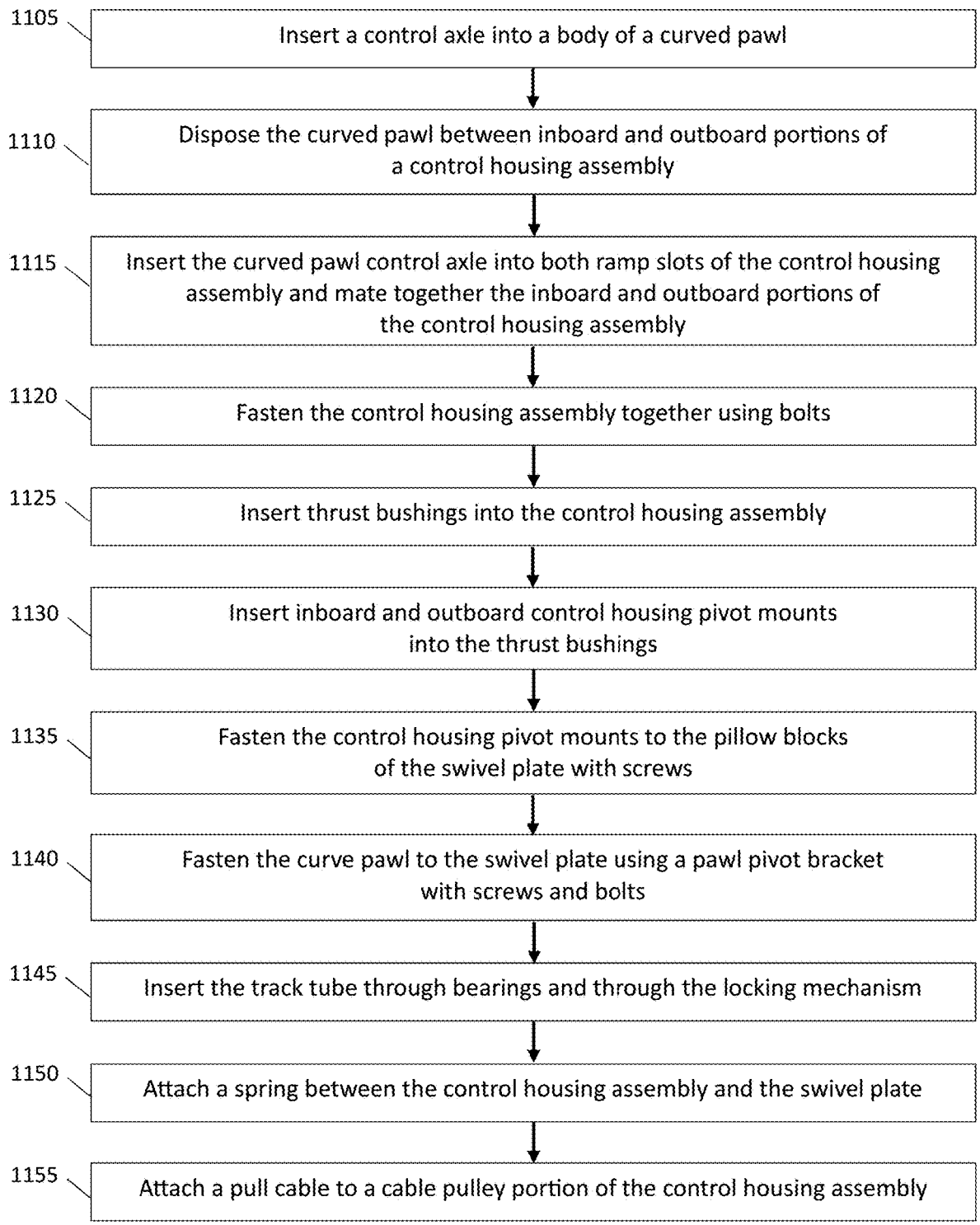
FIG. 11 is a flow chart of a method for installing a position locking apparatus for a seat according to some embodiments.

FIG. 11 is a flow chart of a method for assembling a locking mechanism 20 system according to some embodiments. At operation 1105, a control axle or pin 56 may be inserted into a body of a curved pawl 46. At operation 1110, the curved pawl 46 may be disposed between inboard and outboard portions of a control housing assembly 40. At operation 1115, the curved pawl control axle or pin 56 may be inserted into both ramp slots of the slot 60 of the control housing assembly 40, and the inboard and outboard portions may be mate together. At operation 1120, the control housing assembly 40 may be fastened together using bolts or screws. At operation 1125, thrust bushings 44 may be inserted into the control housing assembly 40. Portions of the thrust bushings 44 may have a smaller outside diameter than an inner diameter of portions of the control housing assembly 40, as illustrated in FIG. 2.

At operation 1130, inboard and outboard control housing pivot mounts 34 may be inserted into the thrust bushings 44, as well as into the inboard and outboard portions of a control housing assembly 40 such the thrust bushings 44 are therebetween. Portions of the pivot mounts 34 may have a smaller outside diameter than an inner diameter of portions of the thrust bushings 44, as illustrated in FIG. 2.

At operation 1135, the control housing pivot mounts 34 may be fastened to the pillow blocks 24 of the swivel plate 26 with screws or bolts. The pivot mounts 34 may be inserted between two pillow blocks 24 with just enough offset to allow the system to rotate without adding noticeable free play, for example. The swivel plate 26 may have alignment features that allow for easy and accurate positioning of the system during assembly, for example. Each pivot mount 34 may get two screws to keep the assembly in place relative to the swivel plate 26, for example.

At operation 1140, the curve pawl 46 may be fastened to the swivel plate 26 using a pawl pivot bracket 54 with screws or bolts. At operation 1145, the track tube 22 may be inserted through bearings 28 in the pillow blocks 24 and through the locking mechanism 20. At operation 1150, a spring 66 may be attached between the control housing assembly 40 and the swivel plate 26.

At operation 1155, a pull cable 72 may be attached to a cable pulley 70 portion of the control housing assembly 40. According to some embodiments, the operations 1105 to 1155 may be sequentially performed, but are not necessarily sequentially performed. For example, the sequence of the operations may be changed, or at least two operations may be performed in parallel.

An embodiment position locking apparatus for a seat includes a track tube, a set of convex-curved serrations, a radial pawl, a pin, a set of concave-curved serrations, and a motion-translation component. In the embodiment, the track tube extends along a track axis. In the embodiment, the set of convex-curved serrations are disposed along a first side of the track tube, and each of the convex-curved serrations is located along a partial circumference of the track tube at the first side of the track tube. In the embodiment, the radial pawl has a pivot point, the pin extends from a first side of the radial pawl, and the pin is separated from the pivot point by a first spaced distance. In the embodiment, the set of concave-curved serrations is disposed at a second side of the radial pawl, and the set of concave-curved serrations is configured to engage with the set of convex-curved serrations of the track tube to lock a position of the track tube along the track axis relative to the radial pawl. In the embodiment, the motion-translation component is disposed generally concentrically and at least partially about the track axis, the motion-translation component is disposed adjacent the first side of the radial pawl, and the motion-translation component has a slot formed therein. And in the embodiment, the pin extends into the slot, the slot is configured to at least partially constrain motion of the pin such that a pivotal motion of the motion-translation component about the track axis is translated to a slider motion of the pin by the slot to control a rate of angular motion of the radial pawl pivoting about the pivot point of the radial pawl and such that the rate of angular motion of the radial pawl differs from a rate of angular motion of the motion-translation component about the track axis for at least part of the pivotal motion of the motion-translation component.

In some embodiments, the slot is generally L-shaped having an inner slot leg and an outer slot leg, and the slot has an obtuse angle between the inner slot leg and the outer slot leg. In some embodiments, the slot is configured such that the pivotal motion of the motion-translation component about the track axis is translated to two different angular rates of motion for the radial pawl about the pivot point of the radial pawl via the slot acting upon the pin with constrained slider kinematics. In some embodiments, the outer slot leg extends at a greater radial distance from the track axis than the inner slot leg, where a first outer change in radial distance from the track axis per pivot angle about the track axis for the outer slot leg is greater than a first inner change in radial distance from the track axis per pivot angle about the track axis for the inner slot leg. In some embodiments, the obtuse angle is within an obtuse angle range of about 144 degrees to about 147 degrees, where the first outer change in radial distance from the track axis per pivot angle about the track axis for the outer slot leg is within a first outer change range of about 0.3 mm/degree to about 0.5 mm/degree, and where the first inner change in radial distance from the track axis per pivot angle about the track axis for the inner slot leg is within a first inner change range of about 0.0 mm/degree to about 0.1 mm/degree.

In some embodiments, the set of convex-curved serrations on the track tube extend within a convex-curve range of about 100 degrees to about 152 degrees, and the set of concave-curved serrations on the radial pawl extend within a concave-curve range of about 70 degrees to about 80 degrees.

In some embodiments, the position locking apparatus further includes a cable pulley portion extending from the motion-translation component, and the cable pulley portion is configured to attach and receive a pull cable.

In some embodiments, the pin extends along a pin axis, the pin axis is generally parallel with the track axis, and a pivot axis extending through the pivot point of the radial pawl is generally parallel with the track axis.

In some embodiments, the position locking apparatus further includes a spring coupled to the motion-translation component at a second spaced distance from the track axis, and the spring is configured to force a pivot of the motion-translation component about the track axis such that the set of concave-curved serrations of the radial pawl engage with at least some of the convex-curved serrations of the track tube via the slot pressing against and guiding a motion of the radial pawl to releasably fix the track tube relative to the radial pawl. In some embodiments, a lock angle is about 90 degrees, and the lock angle is at the track axis between a spring attachment point on the motion-translation component where the spring is coupled to the motion-translation component and the pin of the radial pawl at a locked position.

An embodiment lock mechanism includes a cylindrical track, a set of curved track teeth, a radial pawl, a first pin portion, a set of curved pawl teeth, a first control housing portion, and a spring. In the embodiment, the cylindrical track extends along a track axis and along a first direction. In the embodiment, the set of curved track teeth is disposed in the cylindrical track, each of the curved track teeth extends along a second direction, and the set of curved track teeth is distributed along the first direction, where the second direction is generally perpendicular to the first direction. In the embodiment, the radial pawl is configured to pivot about a pivot axis, the pivot axis is generally parallel with the track axis, and the pivot axis is separated from the track axis by a first spaced distance. In the embodiment, the first pin portion extends along the first direction and extends from a first side of the radial pawl, and the first pin portion is separated from the pivot axis by a second spaced distance. In the embodiment, the set of curved pawl teeth is disposed on a second side of the radial pawl, each of the curved pawl teeth extends along a third direction, the third direction is generally perpendicular to the first direction and generally perpendicular to the pivot axis, the set of curved pawl teeth is configured to generally mate with a subset of the set of curved track teeth, and the set of curved pawl teeth is separated from the pivot axis by a third spaced distance. In the embodiment, the cylindrical track extends through the first control housing portion, the first control housing portion is generally concentric with the cylindrical track and configured to pivot generally about the track axis, a first slot is disposed in a first side of the first control housing portion, the first pin portion is disposed in the first slot such that the first side of the radial pawl faces the first side of the first control housing portion, the first slot has a first inner slot portion and a first outer slot portion, the first outer slot portion extends at a greater radial distance from the track axis than the first inner slot portion, and a first outer change in radial distance from the track axis per pivot angle about the track axis for the first outer slot portion is greater than a first inner change in radial distance from the track axis per pivot angle about the track axis for the first inner slot portion. And in the embodiment, the spring is coupled to the first control housing portion at a fourth spaced distance from the track axis, and the spring is configured to bias the first control housing portion such that the first pin portion is held in the first inner slot portion such that the set of curved pawl teeth of radial pawl mate with the subset of the set of curved track teeth of the cylindrical track to lock a position of the cylindrical track relative to the radial pawl.

In some embodiments, the lock mechanism includes a second pin portion extending along the first direction and extending from a third side of the radial pawl, the third side being opposite of the first side of the radial pawl, the second pin portion being separated from the pivot axis by the second spaced distance, and a second control housing portion, where the cylindrical track extends through the second control housing portion, the second control housing portion is generally concentric with the cylindrical track and configured to pivot generally about the track axis, where the second control housing portion has a second slot formed in a first side of the second control housing portion, where the second pin portion is disposed in the second slot such that the third side of the radial pawl faces the first side of the second control housing portion, the second slot has a second inner slot portion and a second outer slot portion, the second outer slot portion extends at a greater radial distance from the track axis than the second inner slot portion, and a second outer change in radial distance from the track axis per pivot angle about the track axis for the second outer slot portion is greater than a second inner change in radial distance from the track axis per pivot angle about the track axis for the second inner slot portion.

In some embodiments, the first control housing portion and the second control housing portion are separate components, where the first control housing portion is attached to the second control housing portion such that the first side of the first control housing portion faces the first side of the second control housing portion and such that the radial pawl is disposed between the first control housing portion and the second control housing portion. In some embodiments, the first pin portion and the second pin portion are integral portions of a single pin, and the single pin extends through the radial pawl.

In some embodiments, the lock mechanism further includes a cable pulley portion extending from the first control housing portion, and the cable pulley portion is configured to attach and receive a pull cable. In some embodiments, a slot angle formed between the first inner slot portion and the first outer slot portion is an obtuse angle. In some embodiments, the obtuse angle is within an obtuse angle range of about 144 degrees to about 147 degrees, the first outer change in radial distance from the track axis per pivot angle about the track axis for the first outer slot portion is within a first outer change range of about 0.3 mm/degree to about 0.5 mm/degree, the first inner change in radial distance from the track axis per pivot angle about the track axis for the first inner slot portion is within a first inner change range of about 0.0 mm/degree to about 0.1 mm/degree, the set of curved track teeth of the cylindrical track extend within a curved track teeth range of about 100 degrees to about 152 degrees, the set of curved pawl teeth of the radial pawl extend within a curved pawl teeth range of about 70 degrees to about 80 degrees, and a lock angle is about 90 degrees, where the lock angle is at the track axis between a spring attachment point on the first control housing portion where the spring is coupled to the first control housing portion and the first pin portion of the radial pawl at a locked position.

An embodiment method for installing a position locking apparatus for a seat includes providing a track tube having a track axis extending along a center of the track tube, where the track tube has a set of convex-curved serrations disposed along a first side of the track tube, where each of the convex-curved serrations is located along a partial circumference of the track tube at the first side of the track tube, providing a radial pawl having a pivot point, where the radial pawl has a pin extending from a first side of the radial pawl, where the pin is separated from the pivot point by a first spaced distance, and where a set of concave-curved serrations is disposed at a second side of the radial pawl, providing a motion-translation component, where the motion-translation component has a slot formed therein, placing the first side of the radial pawl adjacent the motion-translation component, such that the pin extends into the slot, where the slot is configured to at least partially constrain motion of the pin such that a pivotal motion of the motion-translation component about the track axis is translated to a slider motion of the pin by the slot to control a rate of angular motion of the radial pawl pivoting about the pivot point of the radial pawl and such that the rate of angular motion of the radial pawl differs from a rate of angular motion of the motion-translation component about the track axis for at least part of the pivotal motion of the motion-translation component, and placing and aligning the track tube adjacent the motion-translation component and the radial pawl, such that a motion-translation component is disposed generally concentrically and at least partially about the track axis, and such that the set of concave-curved serrations is positioned and configured to engage with the set of convex-curved serrations of the track tube to lock a position of the track tube along the track axis relative to the radial pawl.

In some embodiments, a method for installing a position locking apparatus for a seat further includes attaching a spring to the motion-translation component at a second spaced distance from the track axis, where the spring is configured to force a pivot of the motion-translation component about the track axis such that the set of concave-curved serrations of the radial pawl engage with at least some of the convex-curved serrations of the track tube via the slot pressing against and guiding a motion of the radial pawl to releasably fix the track tube relative to the radial pawl.

In some embodiments, a method for installing a position locking apparatus for a seat includes attaching a pull cable to a cable pulley portion extending from the motion-translation component.

While illustrative embodiments have been described with reference to illustrative drawings, this description is not intended to be construed in a limiting sense. Various modifications and combinations of the illustrative embodiments, as well as other embodiments, may be apparent to persons skilled in the pertinent art upon referencing the present disclosure. It is therefore intended that the appended claims encompass any and all of such modifications or embodiments.

What is claimed is:

1. A position locking apparatus for a seat, the apparatus comprising:
   a track tube extending along a track axis;
   a set of convex-curved serrations disposed along a first side of the track tube, each of the convex-curved serrations being located along a partial circumference of the track tube at the first side of the track tube;
   a radial pawl having a pivot point;

a pin extending from a first side of the radial pawl, and the pin being separated from the pivot point by a first spaced distance;

a set of concave-curved serrations disposed at a second side of the radial pawl, the set of concave-curved serrations being configured to engage with the set of convex-curved serrations of the track tube to lock a position of the track tube along the track axis relative to the radial pawl; and a motion-translation component disposed generally concentrically and at least partially about the track axis, the motion-translation component being disposed adjacent the first side of the radial pawl, and the motion-translation component having a slot formed therein;

wherein the pin extends into the slot, the slot being configured to at least partially constrain motion of the pin such that a pivotal motion of the motion-translation component about the track axis is translated to a slider motion of the pin by the slot to control a rate of angular motion of the radial pawl pivoting about the pivot point of the radial pawl and such that the rate of angular motion of the radial pawl differs from a rate of angular motion of the motion-translation component about the track axis for at least part of the pivotal motion of the motion-translation component.

2. The apparatus of claim 1, wherein the slot is generally L-shaped having an inner slot leg and an outer slot leg, and having an obtuse angle between the inner slot leg and the outer slot leg.

3. The apparatus of claim 2, wherein the slot is configured such that the pivotal motion of the motion-translation component about the track axis is translated to two different angular rates of motion for the radial pawl about the pivot point of the radial pawl via the slot acting upon the pin with constrained slider kinematics.

4. The apparatus of claim 2, wherein the outer slot leg extends at a greater radial distance from the track axis than the inner slot leg, wherein a first outer change in radial distance from the track axis per pivot angle about the track axis for the outer slot leg is greater than a first inner change in radial distance from the track axis per pivot angle about the track axis for the inner slot leg.

5. The apparatus of claim 4, wherein the obtuse angle is within an obtuse angle range of about 144 degrees to about 147 degrees, wherein the first outer change in radial distance from the track axis per pivot angle about the track axis for the outer slot leg is within a first outer change range of about 0.3 mm/degree to about 0.5 mm/degree, and wherein the first inner change in radial distance from the track axis per pivot angle about the track axis for the inner slot leg is within a first inner change range of about 0.0 mm/degree to about 0.1 mm/degree.

6. The apparatus of claim 1, wherein the set of convex-curved serrations on the track tube extend within a convex-curve range of about 100 degrees to about 152 degrees, and wherein the set of concave-curved serrations on the radial pawl extend within a concave-curve range of about 70 degrees to about 80 degrees.

7. The apparatus of claim 1, further comprising a cable pulley portion extending from the motion-translation component, the cable pulley portion being configured to attach and receive a pull cable.

8. The apparatus of claim 1, wherein the pin extends along a pin axis, the pin axis being generally parallel with the track axis, and wherein a pivot axis extending through the pivot point of the radial pawl is generally parallel with the track axis.

9. The apparatus of claim 1, further comprising a spring coupled to the motion-translation component at a second spaced distance from the track axis, the spring being configured to force a pivot of the motion-translation component about the track axis such that the set of concave-curved serrations of the radial pawl engage with at least some of the convex-curved serrations of the track tube via the slot pressing against and guiding a motion of the radial pawl to releasably fix the track tube relative to the radial pawl.

10. The apparatus of claim 9, wherein a lock angle is about 90 degrees, the lock angle being at the track axis between a spring attachment point on the motion-translation component where the spring is coupled to the motion-translation component and the pin of the radial pawl at a locked position.

11. A lock mechanism comprising:

a cylindrical track extending along a track axis and along a first direction;

a set of curved track teeth disposed in the cylindrical track, each of the curved track teeth extending along a second direction, and the set of curved track teeth being distributed along the first direction, wherein the second direction is generally perpendicular to the first direction;

a radial pawl configured to pivot about a pivot axis, the pivot axis being generally parallel with the track axis, the pivot axis being separated from the track axis by a first spaced distance;

a first pin portion extending along the first direction and extending from a first side of the radial pawl, the first pin portion being separated from the pivot axis by a second spaced distance;

a set of curved pawl teeth disposed on a second side of the radial pawl, each of the curved pawl teeth extending along a third direction, the third direction being generally perpendicular to the first direction and generally perpendicular to the pivot axis, the set of curved pawl teeth being configured to generally mate with a subset of the set of curved track teeth, and the set of curved pawl teeth being separated from the pivot axis by a third spaced distance;

a first control housing portion, wherein the cylindrical track extends through the first control housing portion, the first control housing portion being generally concentric with the cylindrical track and configured to pivot generally about the track axis, wherein a first slot is disposed in a first side of the first control housing portion, wherein the first pin portion is disposed in the first slot such that the first side of the radial pawl faces the first side of the first control housing portion, the first slot having a first inner slot portion and a first outer slot portion, the first outer slot portion extending at a greater radial distance from the track axis than the first inner slot portion, a first outer change in radial distance from the track axis per pivot angle about the track axis for the first outer slot portion being greater than a first inner change in radial distance from the track axis per pivot angle about the track axis for the first inner slot portion; and a spring coupled to the first control housing portion at a fourth spaced distance from the track axis, the spring being configured to bias the first control housing portion such that the first pin portion is held in the first inner slot portion such that the set of curved pawl teeth of the radial pawl mate with the subset of the set of curved track teeth of the cylindrical track to lock a position of the cylindrical track relative to the radial pawl.

12. The mechanism of claim 11 comprising:
a second pin portion extending along the first direction and extending from a third side of the radial pawl, the third side being opposite of the first side of the radial pawl, the second pin portion being separated from the pivot axis by the second spaced distance; and
a second control housing portion, wherein the cylindrical track extends through the second control housing portion, the second control housing portion being generally concentric with the cylindrical track and configured to pivot generally about the track axis;
wherein the second control housing portion has a second slot formed in a first side of the second control housing portion, wherein the second pin portion is disposed in the second slot such that the third side of the radial pawl faces the first side of the second control housing portion, the second slot having a second inner slot portion and a second outer slot portion, the second outer slot portion extending at a greater radial distance from the track axis than the second inner slot portion, a second outer change in radial distance from the track axis per pivot angle about the track axis for the second outer slot portion being greater than a second inner change in radial distance from the track axis per pivot angle about the track axis for the second inner slot portion.

13. The mechanism of claim 12, wherein the first control housing portion and the second control housing portion are separate components, wherein the first control housing portion is attached to the second control housing portion such that the first side of the first control housing portion faces the first side of the second control housing portion and such that the radial pawl is disposed between the first control housing portion and the second control housing portion.

14. The mechanism of claim 13, wherein the first pin portion and the second pin portion are integral portions of a single pin, and wherein the single pin extends through the radial pawl.

15. The mechanism of claim 11 further comprising a cable pulley portion extending from the first control housing portion, the cable pulley portion being configured to attach and receive a pull cable.

16. The mechanism of claim 11, wherein a slot angle formed between the first inner slot portion and the first outer slot portion is an obtuse angle.

17. The mechanism of claim 16, wherein the obtuse angle is within an obtuse angle range of about 144 degrees to about 147 degrees,
wherein the first outer change in radial distance from the track axis per pivot angle about the track axis for the first outer slot portion is within a first outer change range of about 0.3 mm/degree to about 0.5 mm/degree,
wherein the first inner change in radial distance from the track axis per pivot angle about the track axis for the first inner slot portion is within a first inner change range of about 0.0 mm/degree to about 0.1 mm/degree,
wherein the set of curved track teeth of the cylindrical track extends within a curved track teeth range of about 100 degrees to about 152 degrees, wherein the set of curved pawl teeth of the radial pawl extends within a curved pawl teeth range of about 70 degrees to about 80 degrees, and
wherein a lock angle is about 90 degrees, the lock angle being at the track axis between a spring attachment point on the first control housing portion where the spring is coupled to the first control housing portion and the first pin portion of the radial pawl at a locked position.

18. A method for installing a position locking apparatus for a seat, comprising:
providing a track tube having a track axis extending along a center of the track tube, the track tube having a set of convex-curved serrations disposed along a first side of the track tube, wherein each of the convex-curved serrations being located along a partial circumference of the track tube at the first side of the track tube;
providing a radial pawl having a pivot point, the radial pawl having a pin extending from a first side of the radial pawl, the pin being separated from the pivot point by a first spaced distance, and a set of concave-curved serrations disposed at a second side of the radial pawl;
providing a motion-translation component, the motion-translation component having a slot formed therein;
placing the first side of the radial pawl adjacent the motion-translation component, such that the pin extends into the slot, the slot being configured to at least partially constrain motion of the pin such that a pivotal motion of the motion-translation component about the track axis is translated to a slider motion of the pin by the slot to control a rate of angular motion of the radial pawl pivoting about the pivot point of the radial pawl and such that the rate of angular motion of the radial pawl differs from a rate of angular motion of the motion-translation component about the track axis for at least part of the pivotal motion of the motion-translation component; and
placing and aligning the track tube adjacent the motion-translation component and the radial pawl, such that a motion-translation component disposed generally concentrically and at least partially about the track axis, and such that the set of concave-curved serrations being positioned and configured to engage with the set of convex-curved serrations of the track tube to lock a position of the track tube along the track axis relative to the radial pawl.

19. The method of claim 18 comprising attaching a spring to the motion-translation component at a second spaced distance from the track axis, the spring being configured to force a pivot of the motion-translation component about the track axis such that the set of concave-curved serrations of the radial pawl engage with at least some of the convex-curved serrations of the track tube via the slot pressing against and guiding a motion of the radial pawl to releasably fix the track tube relative to the radial pawl.

20. The method of claim 18 comprising attaching a pull cable to a cable pulley portion extending from the motion-translation component.

* * * * *